United States Patent
Shinohara et al.

(10) Patent No.: US 11,412,596 B2
(45) Date of Patent: Aug. 9, 2022

(54) DISPLAY SWITCHING DEVICE AND SWITCH

(71) Applicant: OMRON Corporation, Kyoto (JP)

(72) Inventors: Masayuki Shinohara, Nagaokakyo (JP); Yuto Mori, Kyoto (JP); Yoshihiko Takagi, Kyoto (JP); Gouo Kurata, Kawanishi (JP); Tsuyoshi Arai, Koka (JP); Yasuhiro Tanoue, Kyoto (JP)

(73) Assignee: OMRON Corporation, Kyoto (JP)

( * ) Notice: Subject to any disclaimer, the term of this patent is extended or adjusted under 35 U.S.C. 154(b) by 184 days.

(21) Appl. No.: 16/846,399

(22) Filed: Apr. 12, 2020

(65) Prior Publication Data
US 2020/0359484 A1    Nov. 12, 2020

(30) Foreign Application Priority Data

May 7, 2019  (JP) ............................. JP2019-087895

(51) Int. Cl.
*H05B 47/10* (2020.01)
*G02B 3/00* (2006.01)

(52) U.S. Cl.
CPC ........... *H05B 47/10* (2020.01); *G02B 3/0037* (2013.01)

(58) Field of Classification Search
CPC .......... H05B 47/00; H05B 47/10; G02B 3/00; G02B 3/0037; G02B 30/27
See application file for complete search history.

(56) References Cited

U.S. PATENT DOCUMENTS

| | | |
|---|---|---|
| 5,719,706 A | 2/1998 | Masumoto et al. |
| 2004/0169831 A1 | 9/2004 | Uehara et al. |
| 2009/0052164 A1 | 2/2009 | Kashiwagi et al. |
| 2009/0086466 A1* | 4/2009 | Sugita ............... G02F 1/133615 362/97.2 |

(Continued)

FOREIGN PATENT DOCUMENTS

| | | |
|---|---|---|
| CN | 1407369 | 4/2003 |
| CN | 101061424 | 10/2007 |

(Continued)

OTHER PUBLICATIONS

"Office Action of Taiwan Counterpart Application" with English translation thereof, dated Aug. 31, 2021, p. 1-p. 9.

(Continued)

*Primary Examiner* — Jimmy T Vu
(74) *Attorney, Agent, or Firm* — JCIPRNET

(57) ABSTRACT

A display switching device (10) is provided, which switches a display image (P) by switching irradiation of lights from positions of a plurality of light sources (7). The display switching device includes: a lens array (6) in which a plurality of lenses are arranged; and a display part (45) including a plurality of pixel regions (45a) arranged to include a region through which a light, which is formed by condensing each of the lights emitted from the positions of the plurality of light sources (7) with each of the lenses of the lens array (6), passes. A transmittance in each of the pixel regions (45a) is set corresponding to a predetermined stationary pattern. A total area of the pixel regions (45a) in the display part (45) is 60% or less of a total area of a sum of the pixel regions (45a) and the pixel surrounding regions (45b).

18 Claims, 22 Drawing Sheets

(56) References Cited

U.S. PATENT DOCUMENTS

2014/0022619 A1\* 1/2014 Woodgate .......... G02B 27/0093
359/240
2017/0343826 A1 11/2017 De Zwart et al.

FOREIGN PATENT DOCUMENTS

| | | |
|---|---|---|
| CN | 101320103 | 12/2008 |
| CN | 101937133 | 1/2011 |
| CN | 109601013 | 4/2019 |
| DE | 2628833 | 12/1977 |
| JP | S465146 | 2/1971 |
| JP | S51137284 | 11/1976 |
| JP | H02287211 | 11/1990 |
| JP | 2002149097 | 5/2002 |
| JP | 2003195216 | 7/2003 |
| JP | 2010078980 | 4/2010 |
| TW | I514007 | 12/2015 |
| TW | I614533 | 2/2018 |
| TW | M573472 | 1/2019 |
| WO | 2004086122 | 10/2004 |
| WO | 2006045545 | 5/2006 |
| WO | 2014050819 | 4/2014 |

OTHER PUBLICATIONS

"Office Action of Taiwan Counterpart Application", dated Dec. 28, 2020, with English translation thereof, p. 1-p. 13.
"Office Action of China Counterpart Application" with English translation thereof, dated Nov. 1, 2021, p. 1-p. 26.

\* cited by examiner (a)

(b)

(a)

(b)

(c)

(a)

(b)

(a)　　　　　　(b)　　　　　　(c)

(a)　　　　　　(b)

(a)

(b)

(a)

(b)

(a)                    (b)

(a)

(b)

(c)

DISPLAY SWITCHING DEVICE AND SWITCH

CROSS-REFERENCE TO RELATED APPLICATION

This application claims the priority benefits of Japanese application no. 2019-087895, filed on May 7, 2019. The entirety of the above-mentioned patent application is hereby incorporated by reference herein and made a part of this specification.

BACKGROUND

Technical Field

The disclosure relates to a display switching device.

Description of Related Art

Patent Document 1 discloses a backlight display device for automatic viewing of a lenticular image card, which includes an illumination source that selectively illuminates individual images formed on a lenticular medium by design. In the backlight display device, the illumination source of the display directs the light through the microlens side of the lenticular image card to match the viewing distance of the card and the selected viewing angle in order to illuminate the images in sequence continuously.

Specifically, in Patent Document 1, as shown in FIG. 25, the position of the light condensed by the lenticular lens is changed by switching the light sources, thereby selectively illuminating the image on the image layer.

Specifically, FIG. 25 is a schematic diagram showing a configuration of a backlight display device according to the related art. As shown in FIG. 25, the backlight display device according to the related art includes a lenticular lens 60 at least composed of a plurality of microlenses, a plurality of light sources 70 emitting lights toward the lenticular lens 60, and an image layer 50 including a plurality of images.

Then, the condensing position of the light condensed by the lenticular lens 60 is changed by switching on/off of the plurality of light sources 70, thereby selectively illuminating the image on the image layer 50.

RELATED ART

Patent Document

[Patent Document 1] Japanese Laid-Open No. 2003-195216 (published on Jul. 7, 2003)

SUMMARY

Problems to be Solved

However, the related art as described above faces a problem that when the lenticular image card is illuminated by a disturbance light around the backlight display device, a non-displayed pattern may be visually recognized, and the display selectivity is reduced.

An embodiment of the disclosure is to prevent a stationary pattern that is to be switched and displayed from being faintly seen as the user visually recognizes the reflected light resulting from the disturbance light reflected by a pixel region.

Means for Solving the Problems

In view of the above, a display switching device according to an embodiment of the disclosure switches a display image by switching irradiation of lights from a plurality of light source positions. The display switching device includes: a lens array in which a plurality of lenses are arranged; and a display part. The display part includes: a plurality of pixel regions arranged to include a region through which a light, which is formed by condensing each of the lights emitted from the plurality of light source positions with each of the lenses of the lens array, passes; and a pixel surrounding region arranged around each of the pixel regions and having a constant transmittance. A transmittance in each of the pixel regions is set corresponding to a predetermined stationary pattern, and a total area of the pixel regions in the display part is 60% or less of a total area of a sum of the pixel regions and the pixel surrounding regions.

According to the above configuration, since the ratio of the area of the pixel regions in the display part is reduced, it is possible to further prevent the problem that the stationary pattern may be faintly seen due to the difference between the pixel regions.

In addition, in the display switching device according to one aspect described above, the lens array includes a plurality of lenses arranged two-dimensionally.

Further, a display switching device according to one aspect described above switches a display image by switching irradiation of lights from a plurality of light source positions. The display switching device includes: a lens array in which a plurality of lenses are arranged; and a display part including a plurality of pixel regions arranged to include a region through which a light, which is formed by condensing each of the lights emitted from the plurality of light source positions with each of the lenses of the lens array, passes. A transmittance in each of the pixel regions is set corresponding to a predetermined stationary pattern. A location dependency of a color or a reflectance in the display part resulting from a disturbance light emitted from a side opposite to a side where the lens array is arranged with respect to the display part is lower than a location dependency of a transmittance in the display part resulting from a light from a light source.

According to the above configuration, by switching irradiation of the lights from the light source positions, it is possible to switch the stationary pattern to be displayed on the display part through the transmitted light. For such a display switching device, when the user visually recognizes the reflected light resulting from the disturbance light reflected by the pixel region, the stationary pattern to be switched and displayed may be faintly seen. Regarding this, according to the above configuration, since the location dependency of the color or reflectance in the display part resulting from the disturbance light is lower than the location dependency of the transmittance in the display part resulting from the light from the light source, the above problem can be prevented.

To be more specific, in the above-described conventional technology, the pattern is projected by changing the transmittance of the light from the light source, but since the reflectance also changes in the same manner, another pattern that is not intended to be displayed may be visually recognized due to external light. Regarding this, according to the above configuration, by reducing the location dependency of the reflectance, it is possible to prevent the pattern that is not intended to be displayed from being visually recognized due to external light. In other words, the above location dependency indicates the location dependency in the region where the pattern is present.

Furthermore, a display switching device according to one aspect described above switches a display image by switching irradiation of lights from a plurality of light source positions. The display switching device includes: a lens array in which a plurality of lenses are arranged; and a display part. The display part includes: a plurality of pixel regions arranged to include a region through which a light, which is formed by condensing each of the lights emitted from the plurality of light source positions with each of the lenses of the lens array, passes; and a pixel surrounding region arranged around each of the pixel regions and having a constant transmittance. A transmittance in each of the pixel regions is set corresponding to a predetermined stationary pattern, and with respect to reflection resulting from a disturbance light emitted from a side opposite to a side where the lens array is arranged with respect to the display part, a variation width of a reflectance of regions including both the pixel region and the pixel surrounding region in the plurality of pixel regions is smaller than a variation width of a reflectance in only the pixel region.

According to the above configuration, with respect to the reflection resulting from the disturbance light, the variation width of the reflectance of the regions including both the pixel region and the pixel surrounding region is smaller than the variation width of the reflectance in only the pixel region. Therefore, it is possible to prevent the problem that the stationary pattern shown in the pixel region may be faintly seen due to the reflection resulting from the disturbance light.

Further, in the display switching device according to one aspect described above, a reflectance of the pixel surrounding region is constant.

According to the above configuration, since the reflectance of the pixel surrounding region is constant, it is possible to further prevent the above problem.

Furthermore, in the display switching device according to one aspect described above, the display part further includes a pixel surrounding region having a constant transmittance around each of the pixel regions, and the pixel surrounding region blocks a light from the side where the lens array is arranged.

In addition, in the display switching device according to one aspect described above, a reflectance of the pixel surrounding region differs according to a reflectance of the corresponding pixel region.

According to the above configuration, the reflectance of the pixel surrounding region differs according to the reflectance of the corresponding pixel region. Therefore, the variation width of the reflectance of the regions including both the pixel region and the pixel surrounding region in the plurality of pixel regions can be made smaller than the variation width of the reflectance in only the pixel region.

Further, in the display switching device according to one aspect described above, a dummy opening is provided in the pixel surrounding region at a position different from a position where the light is condensed by each of the lenses of the lens array.

According to the above configuration, the dummy opening is provided at a position different from the position where the light is condensed by each of the lenses of the lens array. Therefore, the variation width of the reflectance of the regions including both the pixel region and the pixel surrounding region in the plurality of pixel regions can be made smaller than the variation width of the reflectance in only the pixel region without affecting the transmitted light.

Further, in the display switching device according to one aspect described above, the display part further includes a pixel surrounding region having a constant transmittance around each of the pixel regions, and a total area of the pixel regions in the display part is 60% or less of a total area of a sum of the pixel regions and the pixel surrounding regions.

Moreover, a display switching device according to one aspect described above switches a display image by switching irradiation of lights from a plurality of light source positions. The display switching device includes: a lens array in which a plurality of lenses are arranged; and a display part. The display part includes: a plurality of pixel regions arranged to include a region through which a light, which is formed by condensing each of the lights emitted from the plurality of light source positions with each of the lenses of the lens array, passes; and a pixel surrounding region arranged around each of the pixel regions and having a constant transmittance. A transmittance in each of the pixel regions is set corresponding to a predetermined stationary pattern. A color or a reflectance resulting from a disturbance light emitted from a side opposite to a side where the lens array is arranged with respect to the display part differs depending on a location of the pixel surrounding region.

According to the above configuration, the color or reflectance resulting from the disturbance light differs depending on the location of the pixel surrounding region. Therefore, it is possible for the user to visually recognize a predetermined pattern even when no light is emitted from the light source. Thus, the image formed by the pixel region when the light source does not emit light can be made inconspicuous.

Furthermore, a display switching device according to one aspect described above switches a display image by switching irradiation of lights from a plurality of light source positions. The display switching device includes: a lens array in which a plurality of lenses are arranged; and a display part including a plurality of pixel regions arranged to include a region through which a light, which is formed by condensing each of the lights emitted from the plurality of light source positions with each of the lenses of the lens array, passes. A transmittance in each of the pixel regions is set corresponding to a predetermined stationary pattern. The display switching device further includes a dimming member, absorbing or diffusing a light, on a side opposite to a side where the lens array is arranged with respect to the display part.

According to the above configuration, the reflected light resulting from the disturbance light reflected in the pixel region is reduced. Therefore, the difference in reflected light amount between the pixel regions having different transmittances can be reduced. Thus, when the light source does not emit light, the image formed by the pixel region becomes more difficult to visually recognize.

In addition, in the display switching device according to one aspect described above, a transmittance of the dimming member is 50% or less.

According to the above configuration, the difference in reflected light amount between the pixels that have different transmittances can be reduced by using the dimming member to absorb light.

In the display switching device according to one aspect described above, a haze value of the dimming member is 20% or more.

According to the above configuration, the difference in reflected light amount between the pixels that have different transmittances can be reduced by using the dimming member to diffuse light.

Further, a display switching device according to one aspect described above switches a display image by switching irradiation of lights from a plurality of light source positions. The display switching device includes: a lens array in which a plurality of lenses are arranged; and a display part including a plurality of pixel regions arranged to include a region through which a light, which is formed by condensing each of the lights emitted from the plurality of light source positions with each of the lenses of the lens array, passes. A transmittance in each of the pixel regions is set corresponding to a predetermined stationary pattern. The display switching device further includes an internal light absorbing member, absorbing a disturbance light emitted from a side opposite to a light source, on a light source side with respect to the lens array.

According to the above configuration, the light that passes through the display part and the lens array and is reflected internally can be prevented from passing through the lens array and the display part again to be visually recognized by the user. Therefore, it is possible to prevent the image formed by the pixel region from being faintly seen due to internal reflection of the disturbance light when the light source does not emit light.

In the display switching device according to one aspect described above, the internal light absorbing member is configured by at least one of a substrate and a housing surrounding the display switching device.

According to the above configuration, since at least one of the substrate and the housing has a light absorbing function, it is not necessary to separately provide a member having a light absorbing function.

Further, in the display switching device according to one aspect described above, the display part further includes a pixel surrounding region having a constant transmittance around each of the pixel regions, and a color of the internal light absorbing member is close to a color of the pixel surrounding region as compared with a gray color having a gradation of 50%, or a reflectance of the internal light absorbing member is close to a reflectance of the pixel surrounding region as compared with a reflectance of 50%.

According to the above configuration, the appearance of the internal light absorbing member is close to the appearance of the pixel surrounding region. Therefore, it is possible to prevent the image formed by the pixel region from being faintly seen due to internal reflection of the disturbance light when the light source does not emit light.

Further, the display switching device according to one aspect described above includes: an image layer in which a transmittance distribution state is set according to a pattern to be displayed; and a matrix layer provided separately from the image layer and defining the pixel regions and the pixel surrounding regions.

According to the above configuration, when the pattern to be displayed is changed, only the pattern to be displayed on the display part is changed (change to a display part having a different transmittance distribution state), and it is not required to change the matrix layer. That is, it has an advantage in terms of costs when the display pattern is assumed to be changed. The transmittance of the matrix layer does not need to be 0%. For example, a black matrix layer having a predetermined light blocking function may be used as the matrix layer.

In addition, a switch according to one aspect described above includes the display switching device and detects an operation of a user performed on the display switching device.

Effects

According to an embodiment of the disclosure, it is possible to prevent the stationary pattern that is to be switched and displayed from being faintly seen as the user visually recognizes the reflected light resulting from the disturbance light reflected by the pixel region.

BRIEF DESCRIPTION OF THE DRAWINGS (a) of FIG. 1 is a schematic diagram showing a basic configuration of a display switching device according to an embodiment of the disclosure, and (b) of FIG. 1 is a diagram showing a detailed configuration of (a) of FIG. 1.

FIG. 2 is a schematic diagram showing that a display part of the display switching device in (a) and (b) of FIG. 1 is irradiated with a disturbance light.

(a) of FIG. 3 is a perspective diagram schematically showing the entire display switching device in (a) and (b) of FIG. 1, (b) of FIG. 3 is an interior perspective diagram of (a) of FIG. 3, and (c) of FIG. 3 is a longitudinal cross-sectional diagram of (a) of FIG. 3.

(a), (b), and (c) of FIG. 4 are diagrams respectively showing configuration examples of a microlens array in (a) and (b) of FIG. 1.

FIG. 5 is a diagram showing an example of a light condensing state of the microlens array in (a) and (b) of FIG. 1.

(a) to (d) of FIG. 6 are diagrams respectively showing examples of display switching of the display part in (a) and (b) of FIG. 1.

Figure 1:
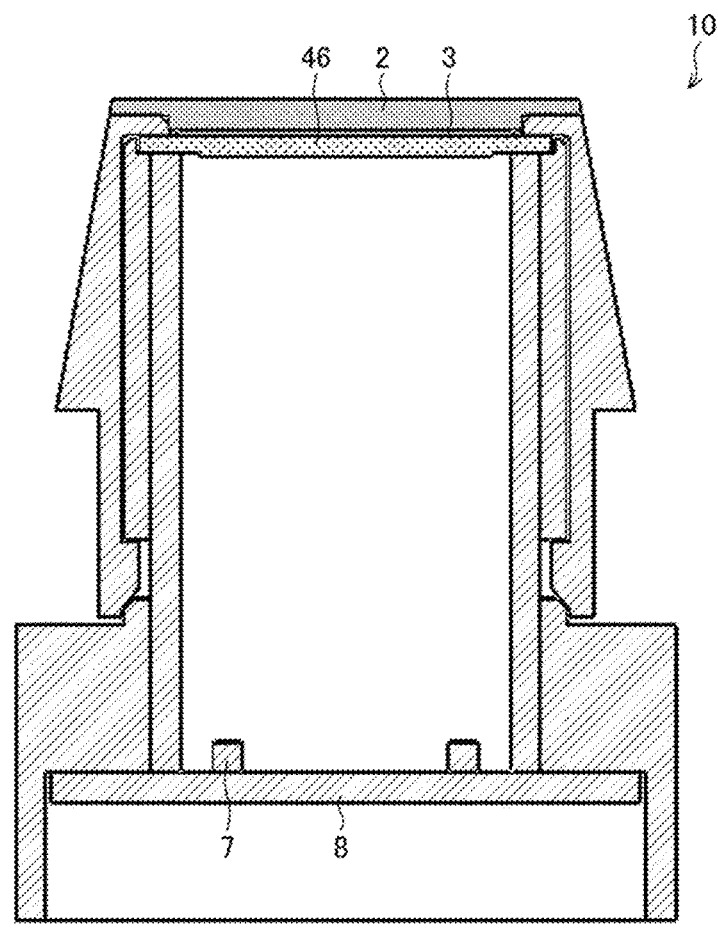
Figure 1:
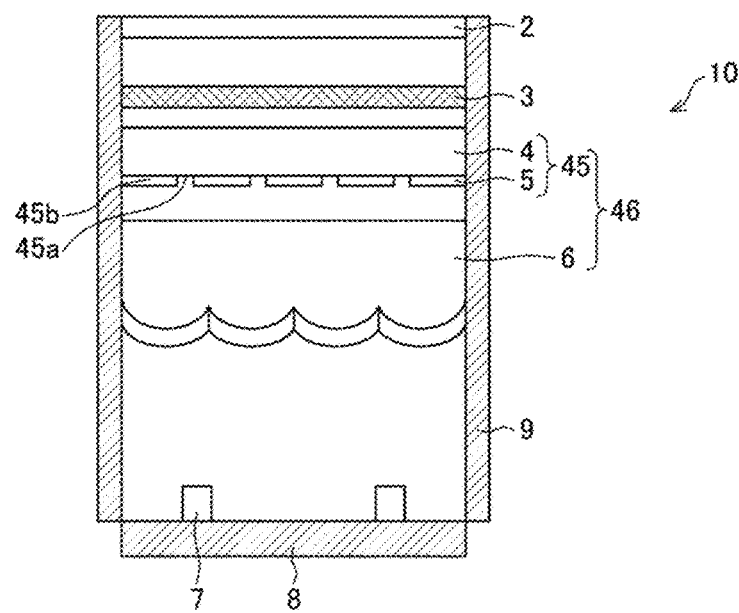
Figure 9:
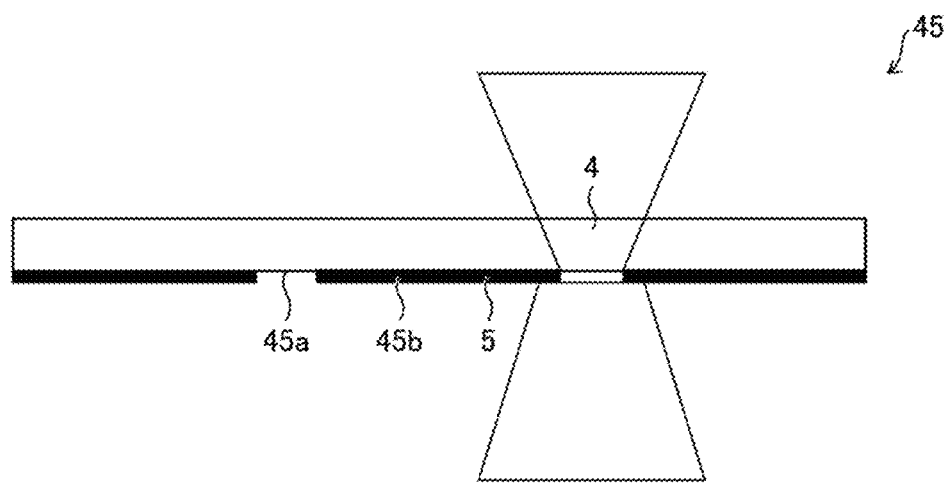
Figure 9:
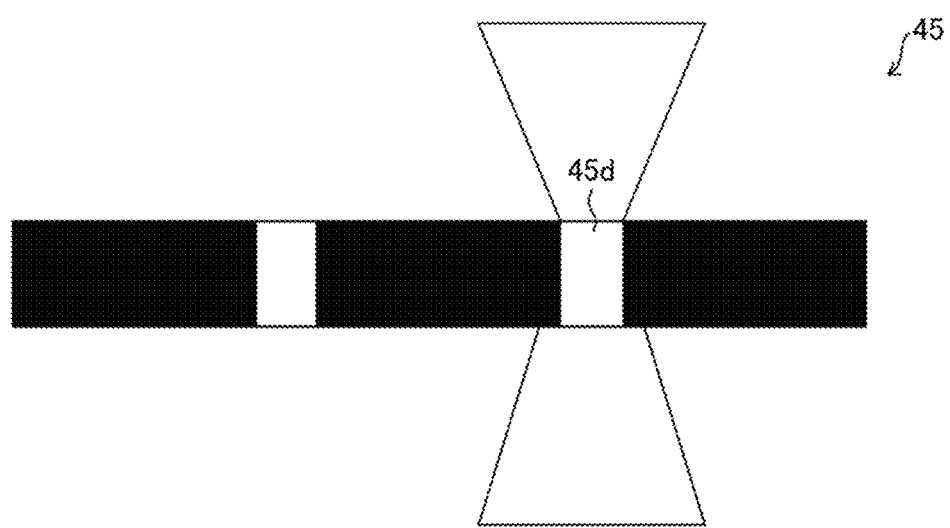

(a) and (b) of FIG. 9 are schematic diagrams showing a configuration of the display part in (a) and (b) of FIG. 1.

Figure 10:
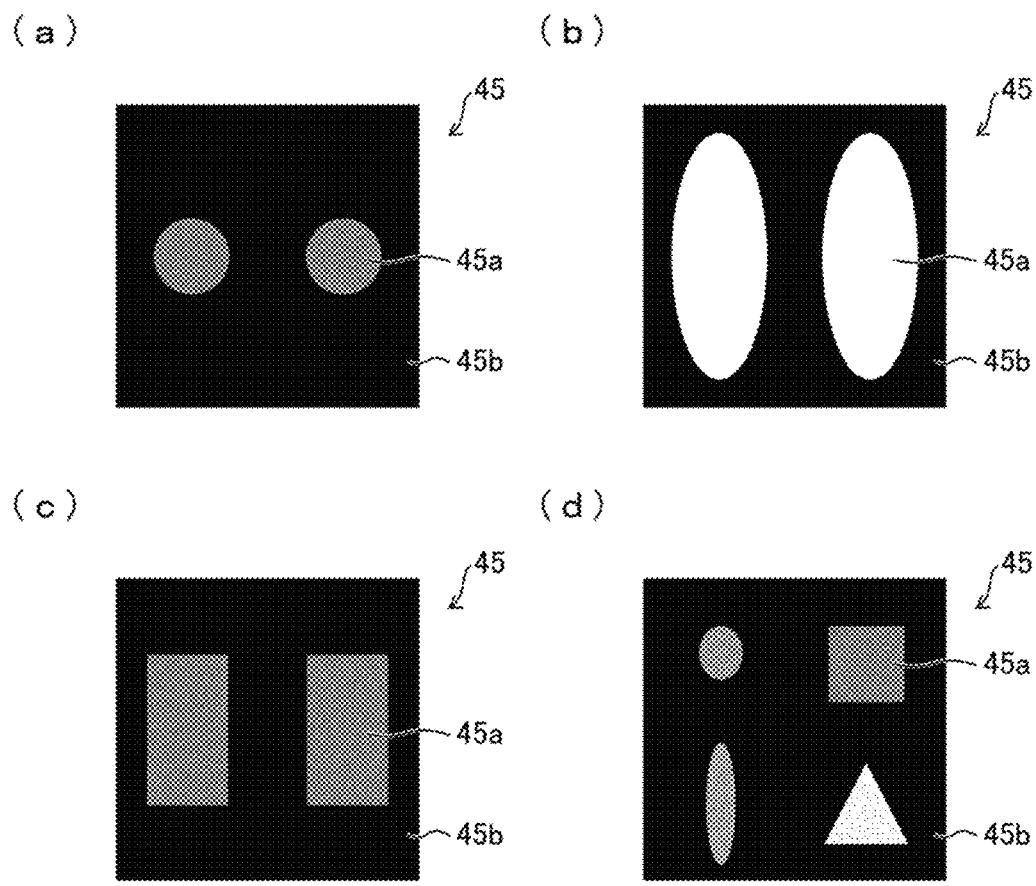

(a) to (d) of FIG. 10 are diagrams respectively showing the shapes of the pixel regions of the display part in (a) and (b) of FIG. 1.

Figure 11:
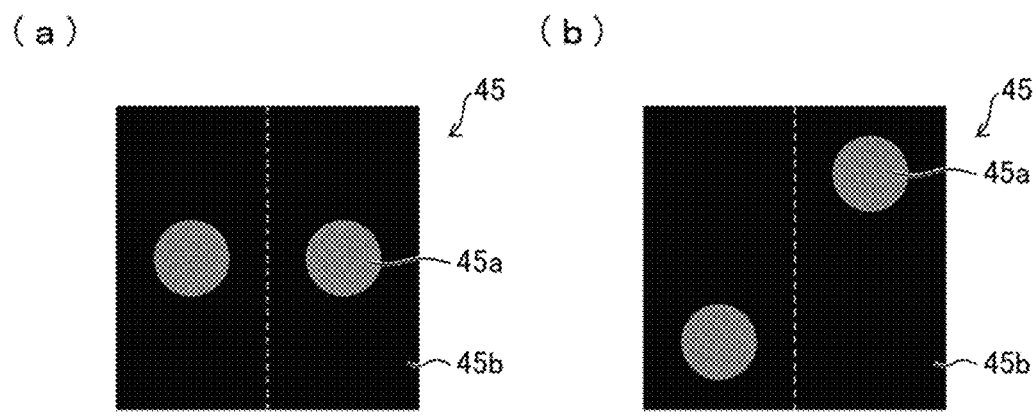

(a) and (b) of FIG. 11 are diagrams respectively showing arrangement examples of the pixel regions in one pixel (arrangement example 1).

Figure 12:
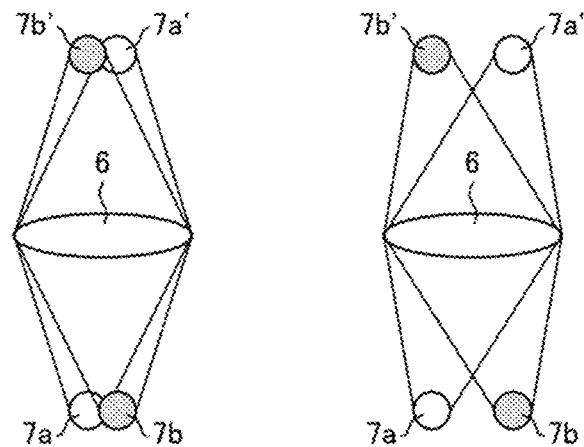

(a) and (b) of FIG. 12 are diagrams illustrating how to adjust a distance between the light sources according to a distance between the pixel regions.

Figure 13:
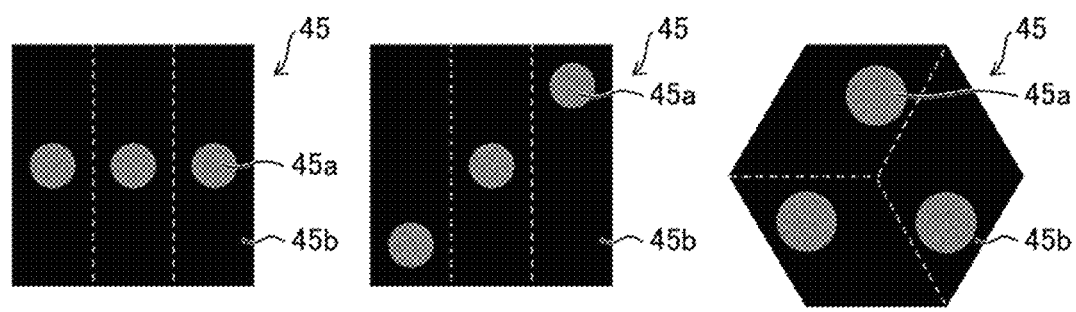
Figure 13:
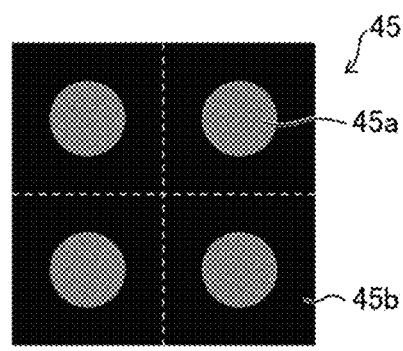

(a) and (b) of FIG. 13 are diagrams respectively showing arrangement examples of the pixel regions in one pixel (arrangement example 2).

Figure 14:
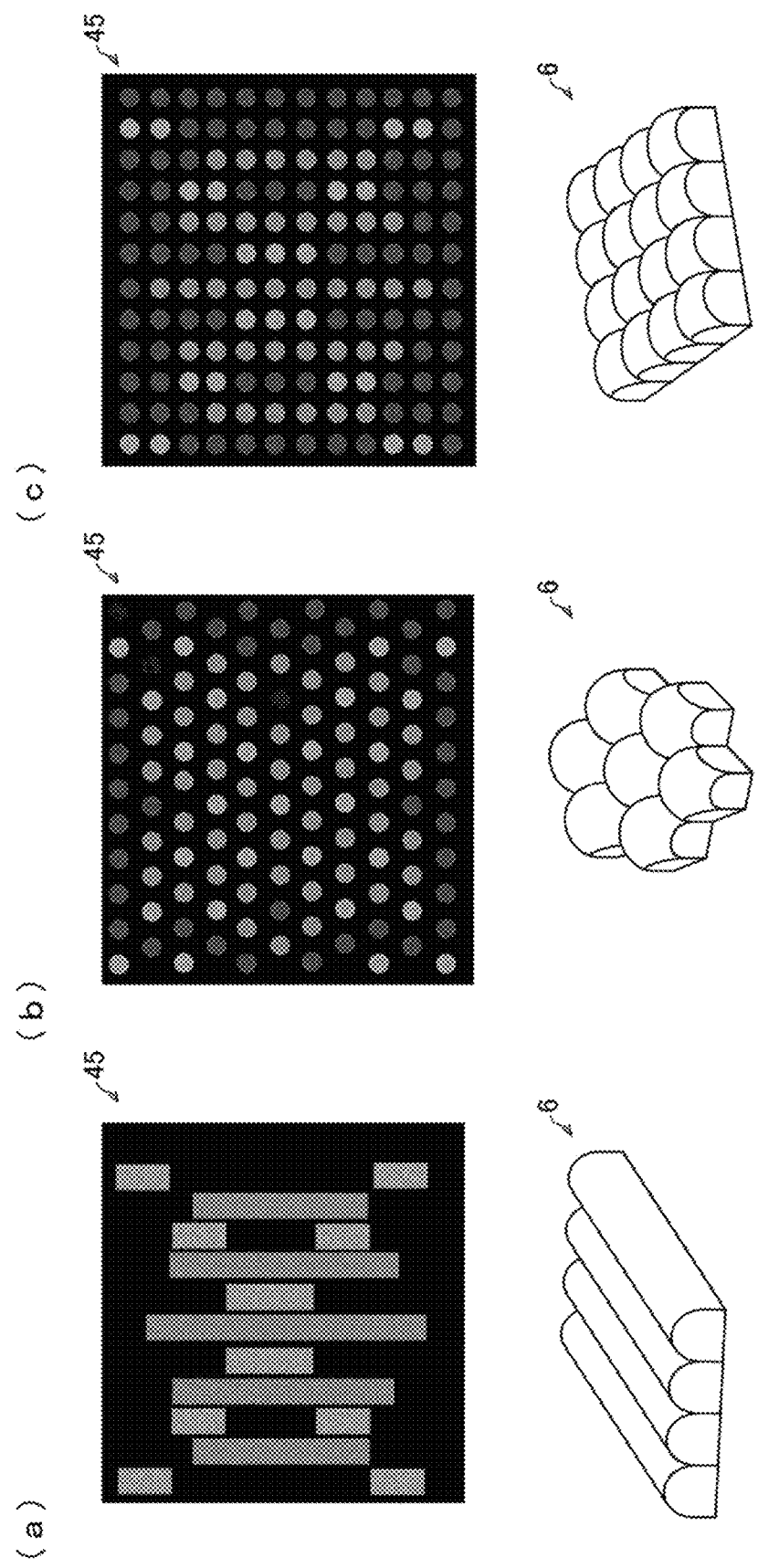

(a) to (c) of FIG. 14 are diagrams showing variations of the arrangement of the pixel regions of the display part in (a) and (b) of FIG. 1.

Figure 15:
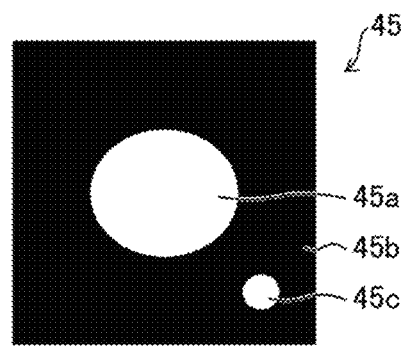

FIG. 15 is a diagram showing an arrangement example of the pixel regions of the display part in (a) and (b) of FIG. 1 (arrangement example 4).

Figure 16:
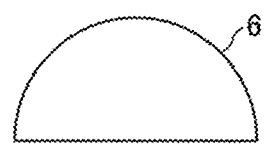
Figure 16:
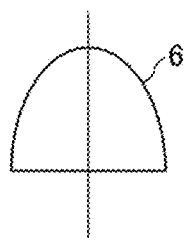
Figure 16:
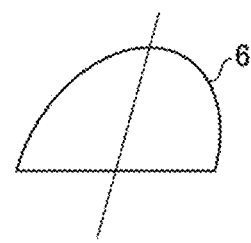

(a) to (c) of FIG. 16 are diagrams showing the cross-sectional shapes of the lenses constituting the microlens array in (a) and (b) of FIG. 1.

Figure 17:
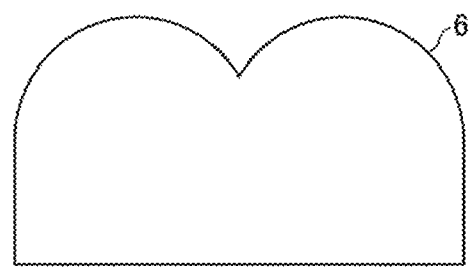
Figure 17:
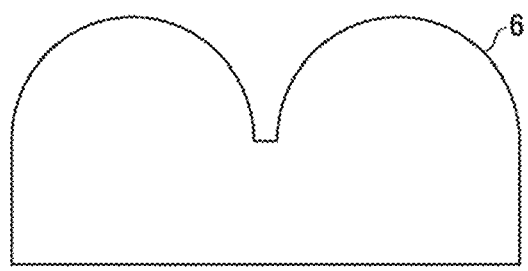

(a) and (b) of FIG. 17 are diagrams showing configuration examples of the lenses constituting the microlens array in (a) and (b) of FIG. 1.

Figure 18:
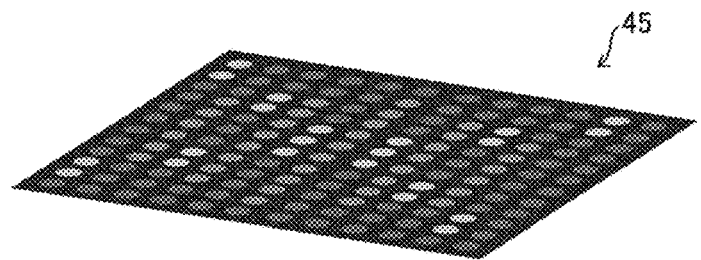
Figure 18:
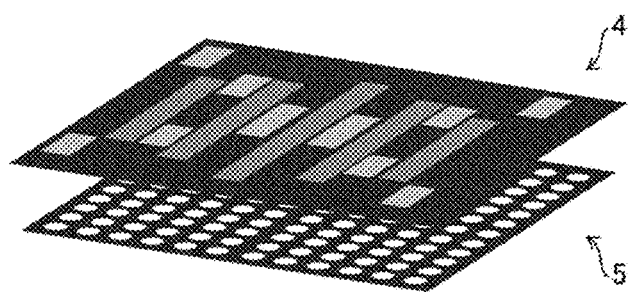

(a) of FIG. 18 is another configuration example of the display part in (a) and (b) of FIG. 1, and (b) of FIG. 18 is yet another configuration example.

Figure 19:
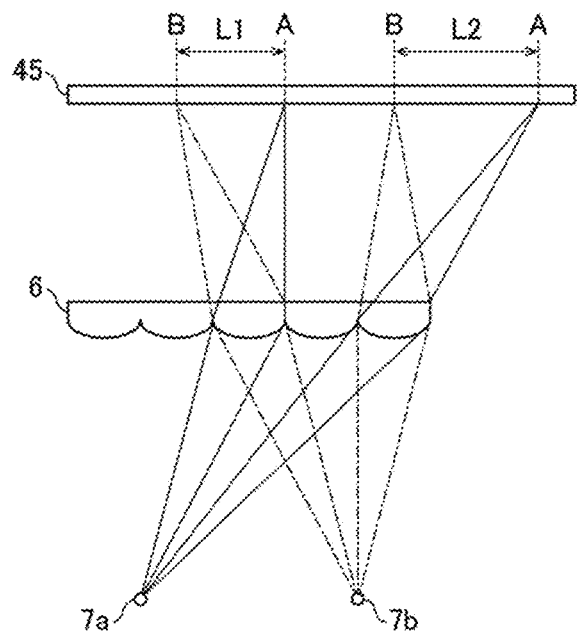

FIG. 19 is a diagram illustrating that an interval between light condensing points increases as the arrangement position of the light source is further away from the optical axis of the lens constituting the lens array.

Figure 20:
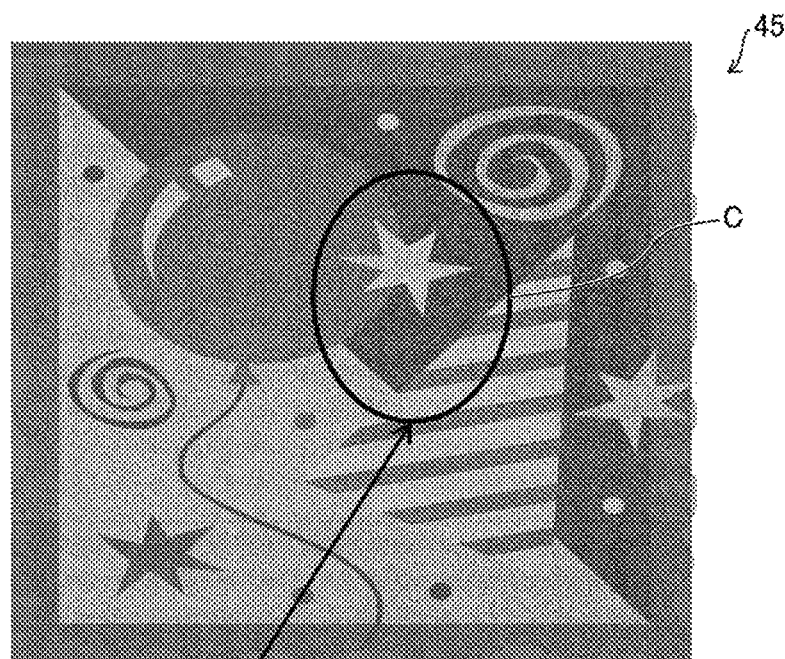
Figure 20:
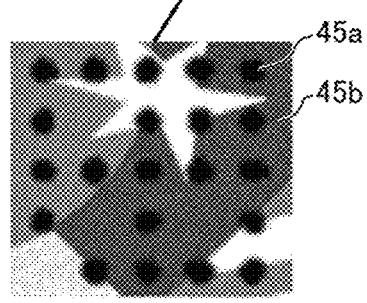

(a) of FIG. 20 is a plan diagram of the display part, and (b) of FIG. 20 is an enlarged diagram of a part of the display part.

Figure 21:
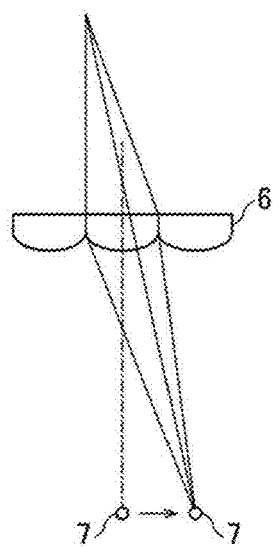

FIG. 21 is a diagram showing a configuration in which the optical axis of the light source in (a) and (b) of FIG. 1 is inclined.

Figure 22:
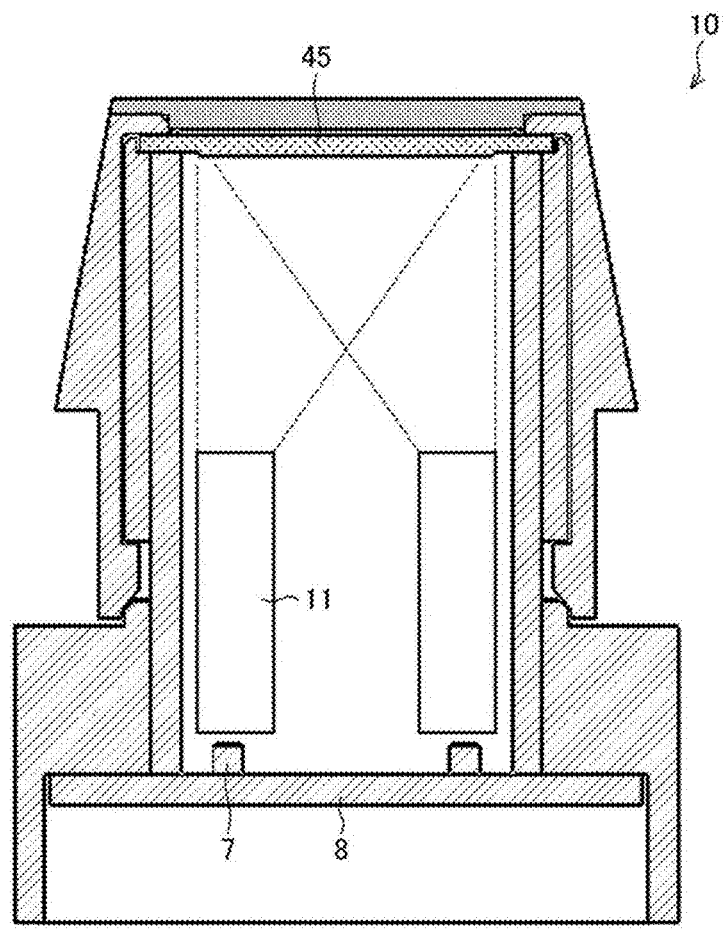

FIG. 22 is a schematic diagram showing a configuration in which the position of the light source is changed using a light guide rod.

Figure 23:
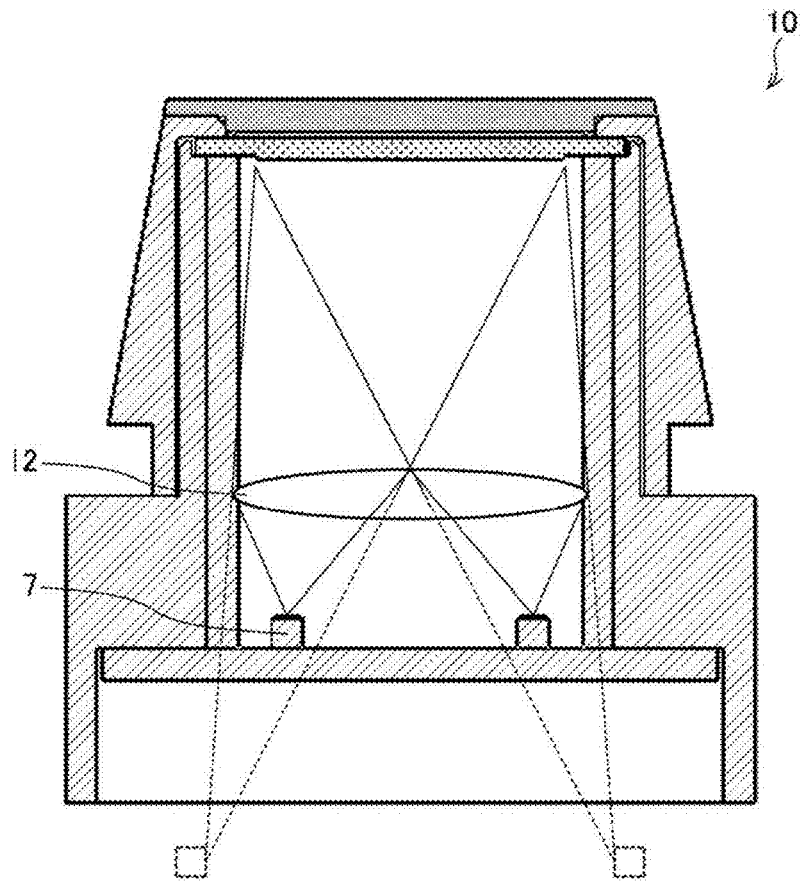

FIG. 23 is a schematic diagram showing a configuration in which the position of the light source is changed using a lens other than the lenses constituting the microlens array in (a) and (b) of FIG. 1.

Figure 24:
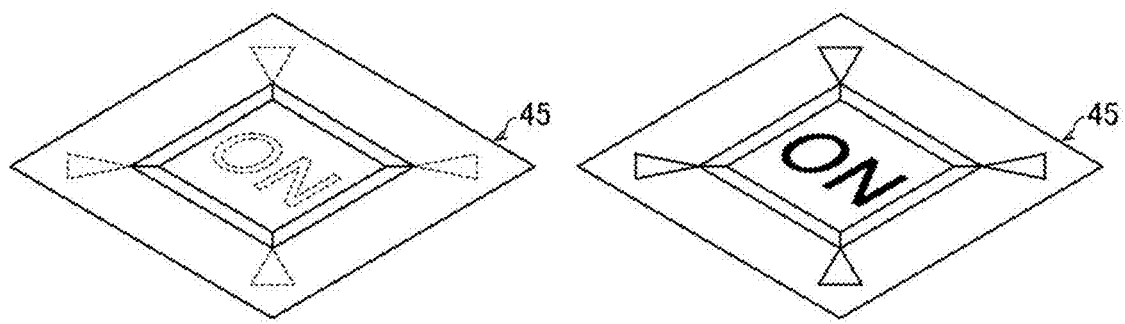

(a) and (b) of FIG. 24 are diagrams showing a specific example of switching between display of a background image and display of specific information.

Figure 25:
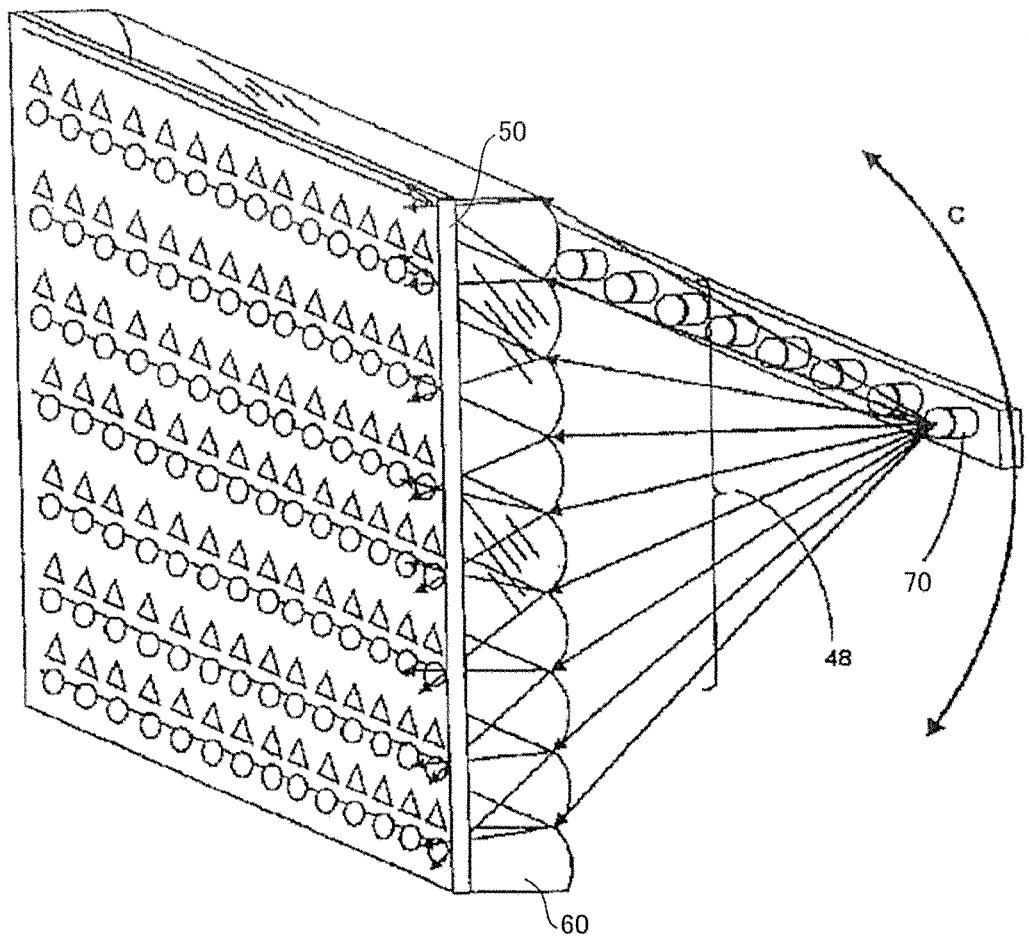

FIG. 25 is a schematic diagram showing a configuration of a backlight display device according to the related art.

Figure 26:
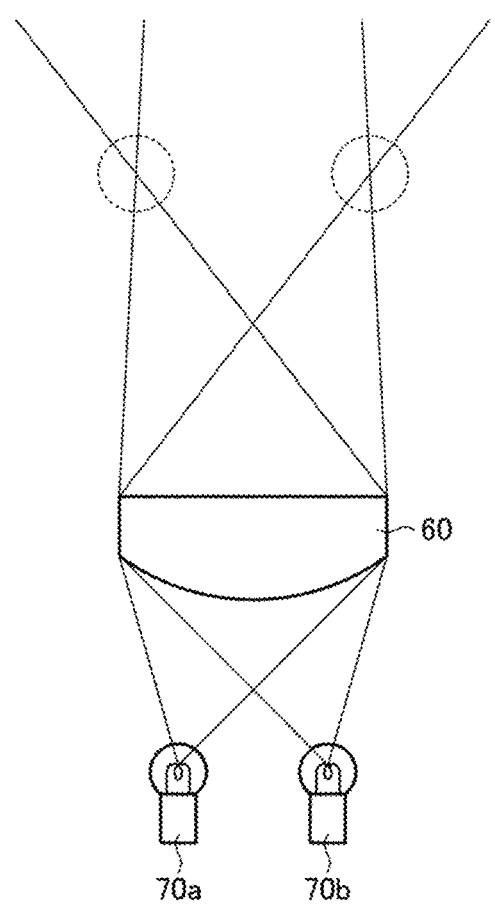

FIG. 26 is an explanatory diagram of display of a configuration which is a premise of the disclosure.

Figure 27:
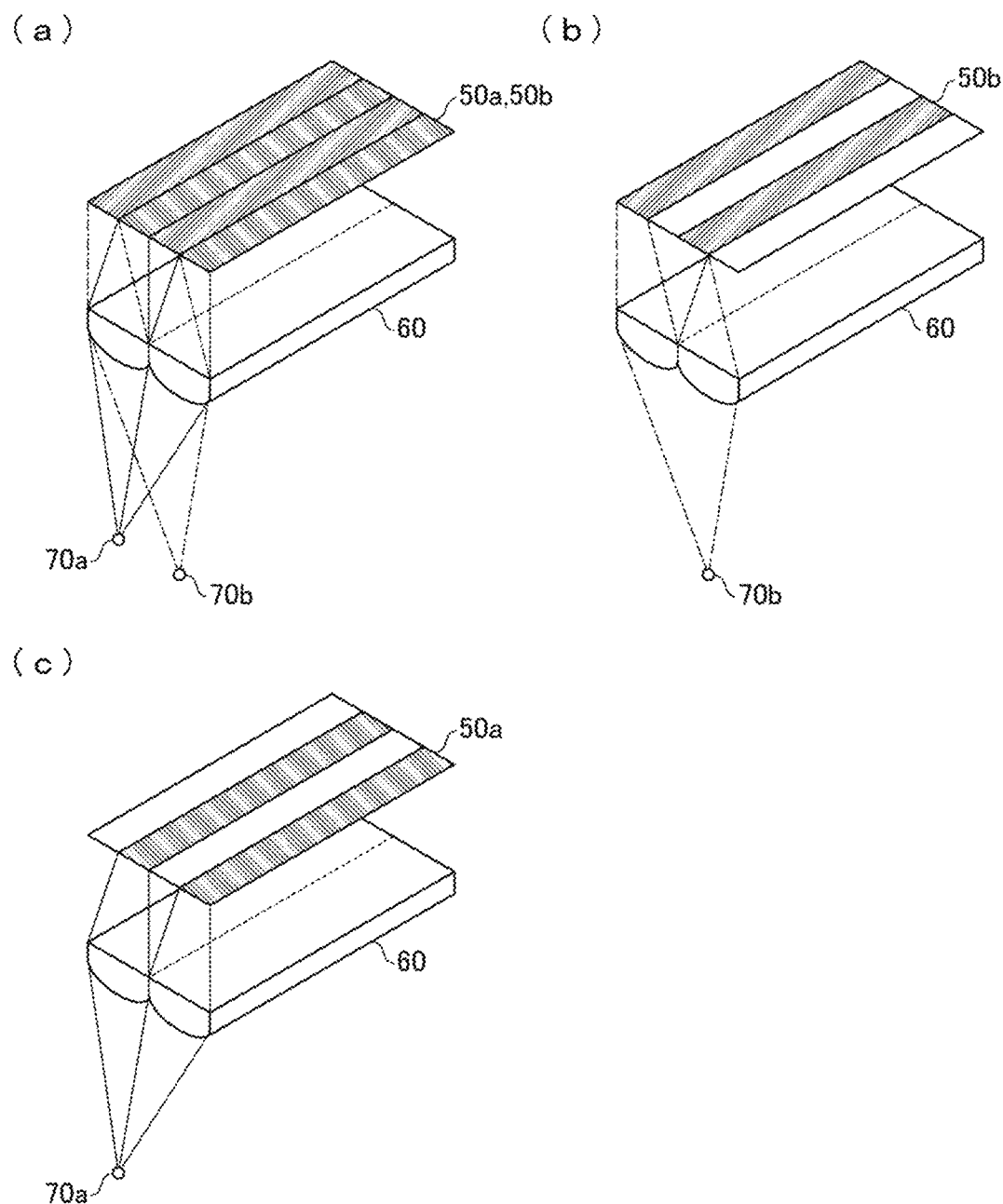

(a) to (c) of FIG. 27 are explanatory diagrams of display of a display switching device as a configuration which is a premise of the disclosure, wherein (a) of FIG. 27 is a display example when two light sources are turned on, (b) of FIG. 27 is a display example when one (right side in the example) light source is turned on, and (c) of FIG. 27 is a display example when the other (left side in the example) light source is turned on.

Figure 28:
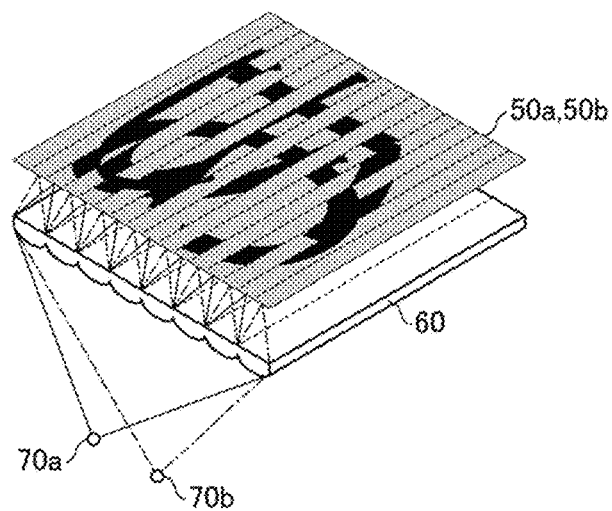
Figure 28:
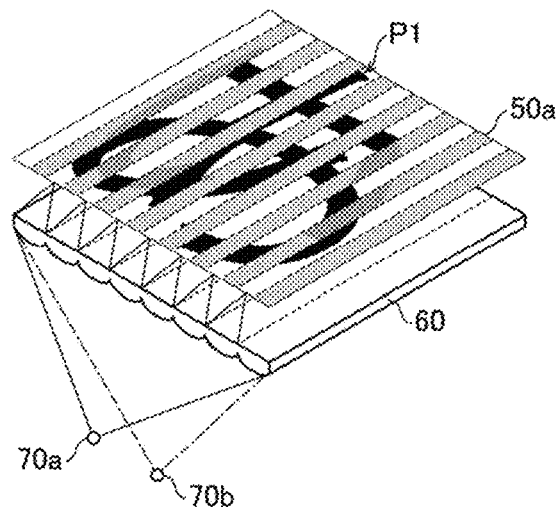
Figure 28:
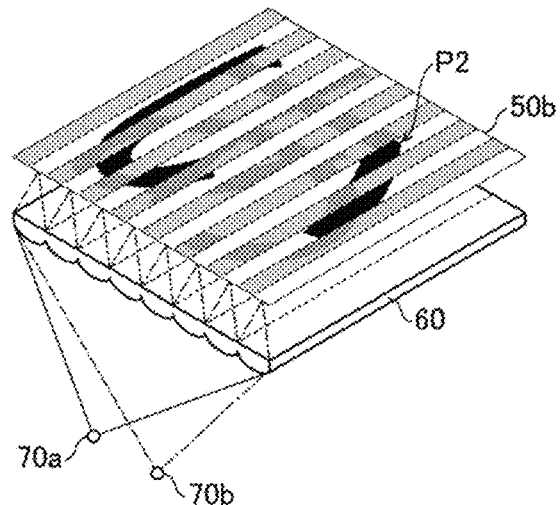

(a) of FIG. 28 is an exemplary diagram showing an image that can be displayed by a configuration which is a premise of the disclosure, (b) of FIG. 28 is a display image example when one (left side in the example) light source is turned on, and (c) of FIG. 28 is a display image example when the other (right side in the example) light source is turned on.

Figure 29:
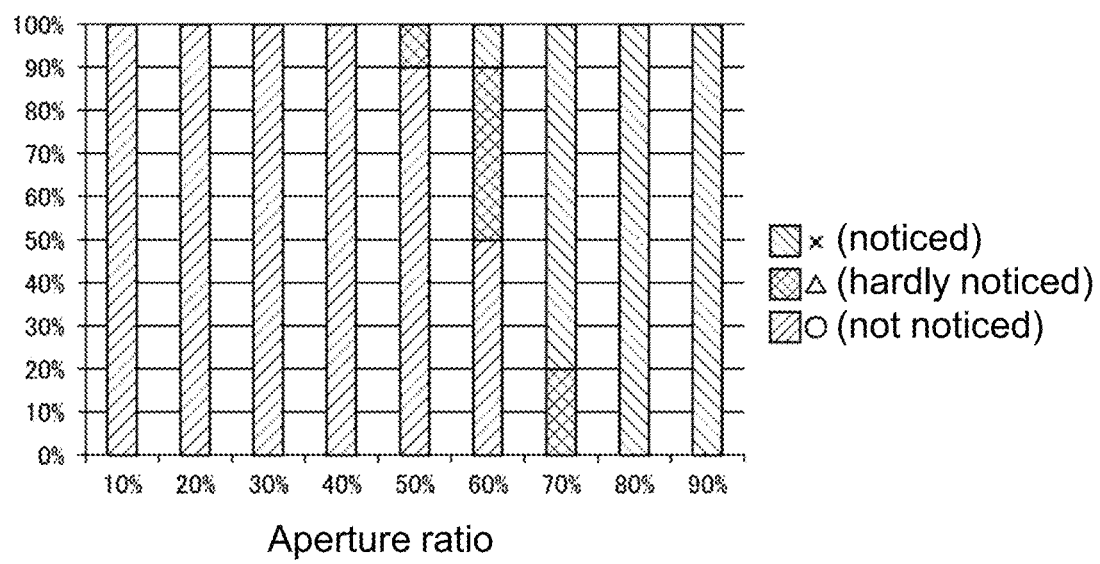

FIG. 29 is a diagram showing a relationship between a ratio (aperture ratio) of the total area of the pixel regions to the total area of the sum of the pixel regions and the pixel surrounding regions, and the statistics of the results of visual recognition of "slightly visible" obtained from a plurality of verifiers.

DESCRIPTION OF THE EMBODIMENTS (Configuration as a Premise of the Present Embodiment)

Before a specific description of an embodiment of the disclosure is given, a configuration which is a premise of the present embodiment will be described hereinafter.

(a) to (c) of FIG. 27 are explanatory diagrams of display of a display switching device as a configuration which is a premise of the present embodiment. The above display switching device can move the light condensing position by switching or moving the light source, and switch the illuminated region. (a) of FIG. 27 is a display example when two light sources are turned on, (b) of FIG. 27 is a display example when one (right side in the example) light source is turned on, and (c) of FIG. 27 is a display example when the other (left side in the example) light source is turned on.

As shown in FIG. 26, by changing the position of the light source 70 (light sources 70a and 70b in the example) that is turned on for one microlens, the light condensing position of the light condensed by the microlens changes.

As shown in (a) of FIG. 27, when the two light sources 70a and 70b are both turned on, all the regions (the second region 50a corresponding to the light source 70a and the first region 50b corresponding to the light source 70b) of the image layer 50 (50a and 50b) are illuminated.

In addition, as shown in (b) of FIG. 27, when one light source 70b is turned on, only the first regions 50b corresponding to the light source 70b are illuminated. Similarly, as shown in (c) of FIG. 27, when the other light source 70a is turned on, only the second regions 50a corresponding to the light source 70a are illuminated. Thus, the illuminated regions 50a and 50b can be switched by switching on/off of the two light sources 70a and 70b.

Further, (a) of FIG. 28 is an exemplary diagram showing an image that can be displayed by the configuration which is a premise of the present embodiment, (b) of FIG. 28 is a display image example when one (left side in the example) light source is turned on, and (c) of FIG. 28 is a display image example when the other (right side in the example) light source is turned on.

As shown in (a) to (c) of FIG. 28, as an example, the configuration which is a premise of the present embodiment is made so that an image such as a first image P1 (hiragana "あ" in the example) and a second image P2 (hiragana "い" in the example) is displayed on the image layer 50, for example. A cylindrical lens 60 is arranged under the image layer 50. The cylindrical lens 60 condenses the lights emitted from the two light sources 70a and 70b.

As an example of the display, for example, when the light source 70a is turned on and the light source 70b is turned off, the first image P1 is displayed. Conversely, when the light source 70a is turned off and the light source 70b is turned on, the second image P2 is displayed.

The configuration has the following problem. That is, when the image layer 50 is illuminated by the light around (disturbance light), the non-displayed pattern may be visually recognized (slightly visible), and the display selectivity may be reduced.

For example, when the above display switching device is installed outdoors, the non-displayed pattern may become "slightly visible" as the display switching device is illuminated by sunlight or illumination equipment.

The "slightly visible" may include the following situations. That is, the image layer 50 is illuminated by the disturbance light, and causes the first image P1 and the second image P2 to be "slightly visible" when they are not displayed, or causes one image to be "slightly visible" when the other image is displayed. This is because the light resulting from the disturbance light illuminates the non-displayed image and enters the human eyes.

A configuration for solving the above-mentioned problem of "slightly visible" in the disclosure will be described hereinafter.

EMBODIMENTS

An embodiment according to one aspect of the disclosure will be described hereinafter with reference to the drawings.

§ 1 Basic Configuration (Basic Configuration of Display Switching Device)

(a) of FIG. 1 is a schematic diagram showing a basic configuration of a display switching device 10 according to the present embodiment, and (b) of FIG. 1 is a diagram showing a detailed configuration of (a) of FIG. 1. As shown in (a) of FIG. 1, the display switching device 10 includes, in order from top to bottom in the drawing, a light absorbing member 2, a light diffusing member 3, a display condensing part 46, a plurality of light sources 7, and a substrate 8.

A case where the display switching device 10 is applied to a key-top of a keyboard for character input will be described hereinafter as an example. The size of each member described hereinafter shows an example when applied to a key-top.

The light absorbing member 2 has a square shape in the top view and has a side length of 14 mm. In addition, four light sources 7 are provided, which are RGBLEDs, for example, and the distance between adjacent light sources 7 is 8 mm. However, the light sources 7 may not be included if required. In that case, the user prepares the light sources.

Specifically, as shown in (b) of FIG. 1, as an example, the light absorbing member 2 is made of a smoked member and has a thickness of 1 mm. The transmittance of the light absorbing member 2 is 20%, for example.

For example, the light diffusing member 3 provided under the light absorbing member 2 has a thickness of 0.1 mm and a haze value of 90%. The details of the light absorbing member 2 and the light diffusing member 3 will be described later.

The display condensing part 46 includes a display part 45 and a microlens array (hereinafter abbreviated as a lens array) 6. The display part 45 is composed of an image layer 4 and a matrix layer 5, and displays an image (display image) P that is to be displayed. The image layer 4 has a thickness of 0.1 mm. The matrix layer 5 includes, for example, pixel regions 45a (openings, the same applies hereinafter), and pixel surrounding regions 45b (masks, the same applies hereinafter) which are regions other than the pixel regions 45a. The image layer 4 and the matrix layer 5 are bonded. The "pixel surrounding region 45b" described here refers to a region around each of the pixel regions 45a and having a constant transmittance. In addition, the pixel surrounding region 45b blocks the light from the light source side, that is, the light from the side where the lens array 6 is arranged.

As shown in (b) of FIG. 1, the lens array 6 provided under the display part 45 condenses the lights emitted from the plurality of light sources 7 attached to the substrate 8. The thickness thereof is 0.4 mm. The lens array 6 is configured by arranging a plurality of lenses.

The display part 45 includes a plurality of pixel regions 45a which are arranged to include a region through which a light, which is formed by condensing each of the lights emitted from the positions of the plurality of light sources 7 with each of the lenses of the lens array 6, passes. The transmittance of each of the pixel regions 45a is set corresponding to a predetermined stationary pattern.

The light absorbing member 2, the light diffusing member 3, the display part 45, and the lens array 6 are supported by a housing 9. Further, by attaching the housing 9 to the substrate 8 to which the plurality of light sources 7 are attached, the basic configuration of the display switching device 10 is formed. In addition, the display switching device 10 may include a protective layer for preventing damage above the light absorbing member 2. The details of the substrate 8 and the housing 9 will be described later.

In (b) of FIG. 1, the distance from the upper end of the light source 7 to the lower end of the lens array 6 is 20 mm.

In the display switching device 10 having the above-described configuration, the display image P is switched by switching the irradiation of the lights from the positions of the plurality of light sources 7. The switching of on/off of the light source 7 is performed by a light source control part (not shown). The light source control part is configured by, for example, an IC chip provided on a substrate in a keyboard, and performs light source control based on, for example, an instruction from a PC main body.

Figure 3:
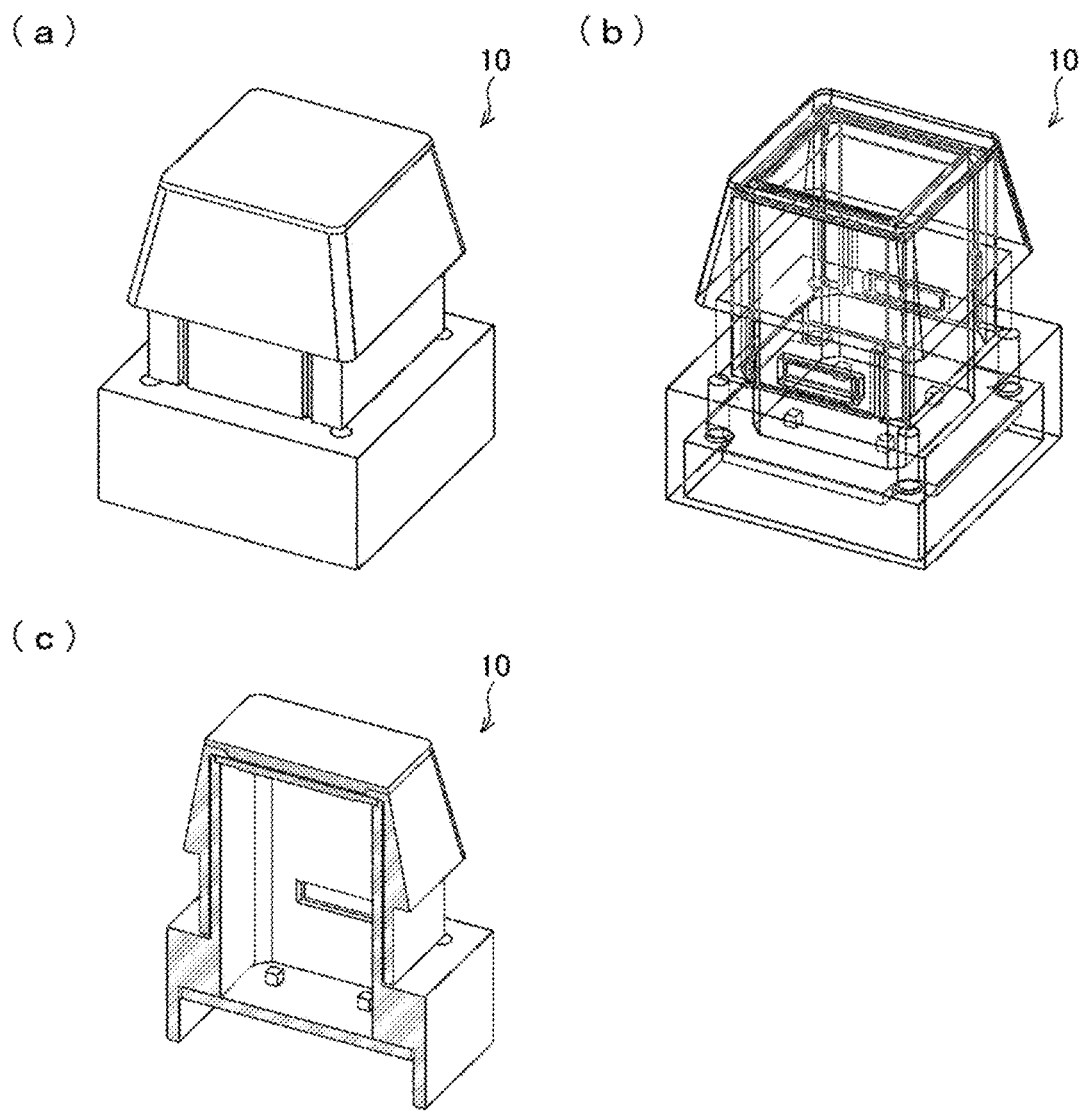

(a) of FIG. 3 is a perspective diagram schematically showing the entire display switching device 10 in (a) and (b) of FIG. 1, (b) of FIG. 3 is an interior perspective diagram of (a) of FIG. 3, and (c) of FIG. 3 is a longitudinal cross-sectional diagram of (a) of FIG. 3. The configuration shown in (a) to (c) of FIG. 3 is merely an example and is not intended to limit the configuration of the display switching device 10.

(Configuration Example of Lens Array)

Figure 4:
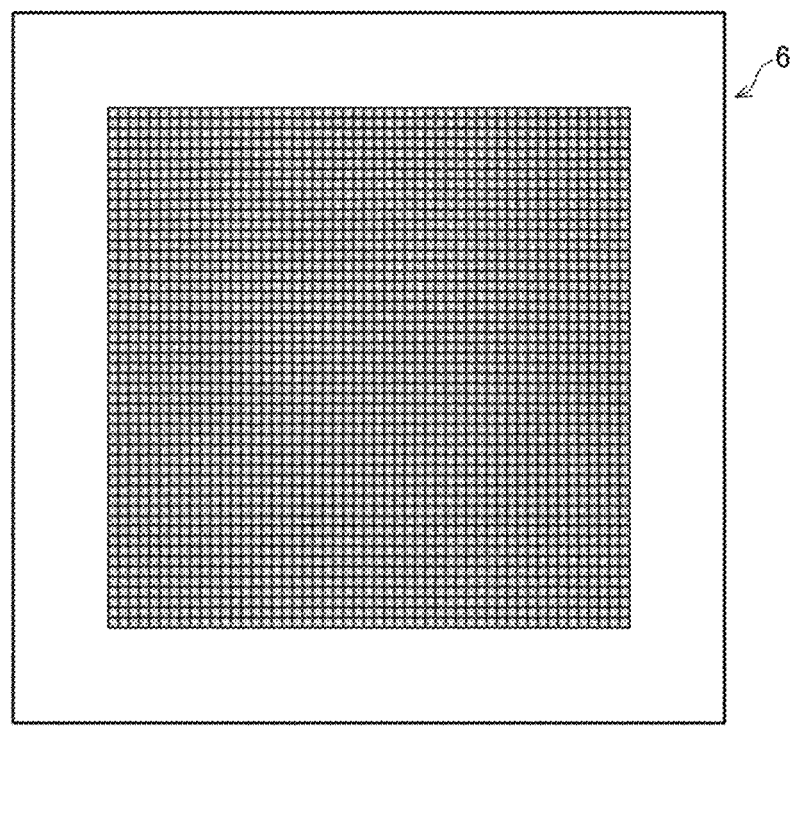
Figure 4:
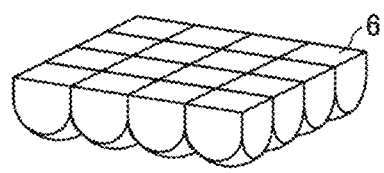
Figure 4:

(a), (b), and (c) of FIG. 4 are diagrams respectively showing configuration examples of the lens array 6 in (a) and (b) of FIG. 1. Specifically, as shown in (a) of FIG. 4, the lens array 6 includes a plurality of lenses arranged in a two-dimensional matrix.

(b) of FIG. 4 is an enlarged perspective diagram of a part of the lens array 6, and (c) of FIG. 4 is an enlarged partial cross-sectional diagram of a part of the lens array 6.

Figure 5:
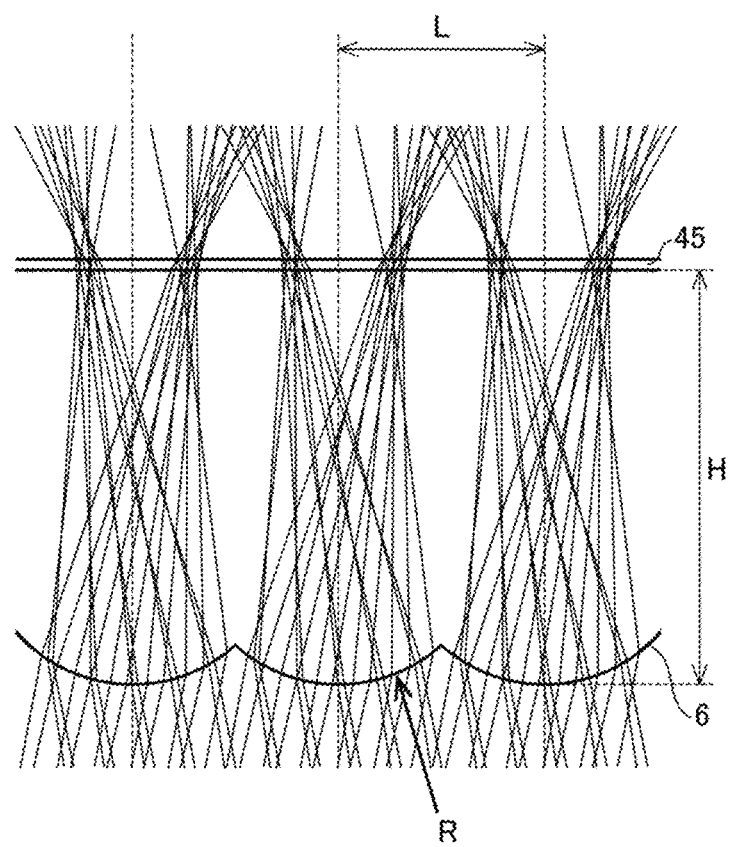

FIG. 5 is a diagram showing an example of a light condensing state of the lens array 6. As shown in the drawing, it can be confirmed that changing the position of the light source changes the light condensing location.

When the display switching device 10 is applied to a key-top of a keyboard, as an example of the dimensions of the plurality of lenses that constitute the lens array 6, the distance L between adjacent lenses is about 200 μm, the radius of curvature R of the protruding portion of each lens is about 150 μm, the maximum thickness H in the light emission direction of each lens is about 400 μm, and the refractive index n of the lens is 1.5.

Figure 6:
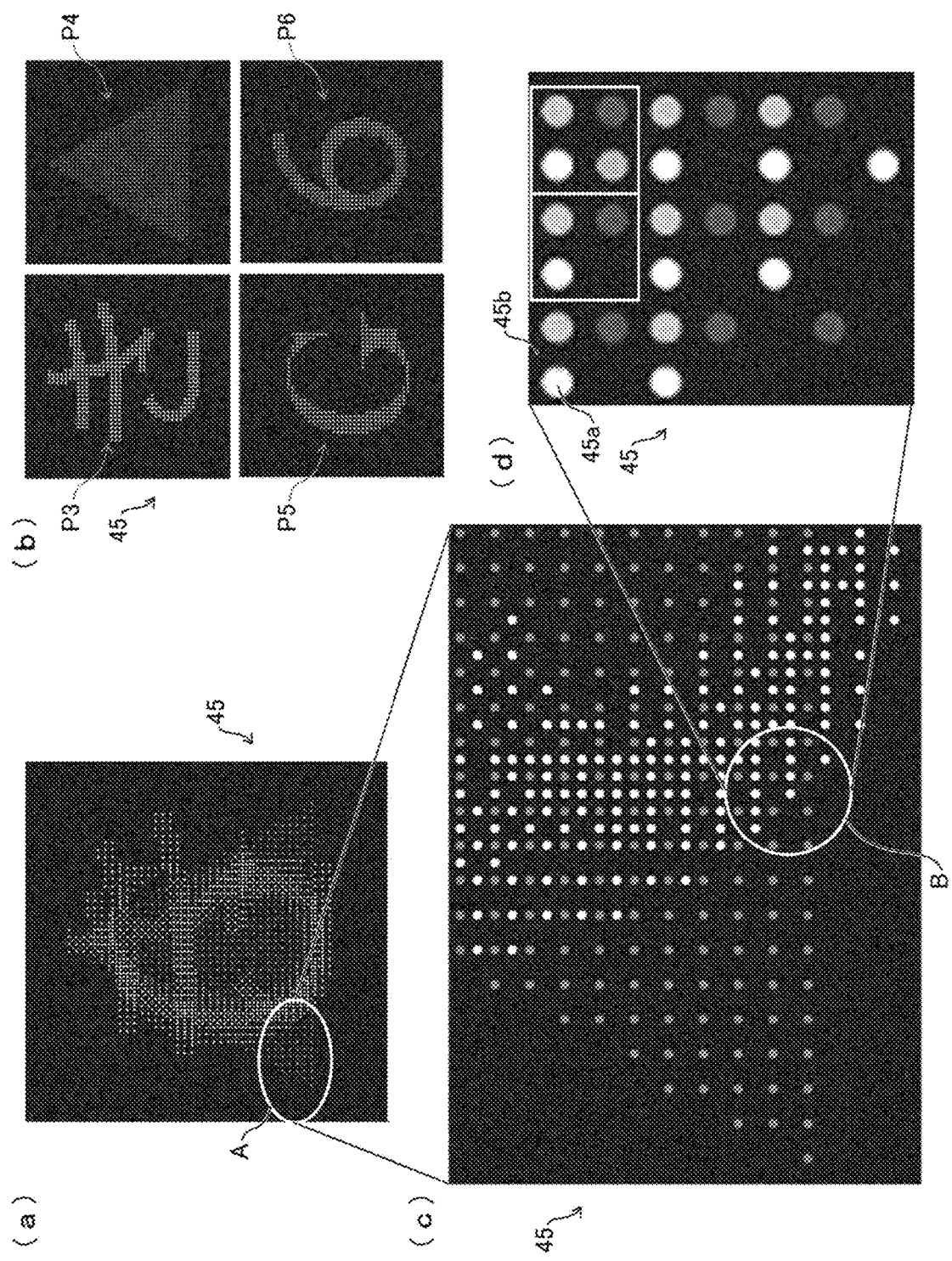

(a) to (d) of FIG. 6 are diagrams respectively showing examples of display switching of the display part 45. (a) of FIG. 4 is a display example displayed on the display part 45 (image layer 4), (b) of FIG. 4 is an example of a displayed pattern, (c) of FIG. 4 is an enlarged diagram of the part A of (a) of FIG. 4, and (d) of FIG. 4 is an enlarged diagram of the part B of (c) of FIG. 4.

In the display example shown in (a) to (d) of FIG. 6, for example, a third image P3 (hiragana " き " in the example), a fourth image P4 (pattern "Δ" in the example), a fifth image P5 (uppercase alphabet "G" in the example), and a sixth image P6 (number "6" in the example) can be switched and displayed on the same image layer.

As shown in (d) of FIG. 6, as an example, it is possible to switch the display by dividing the entire display part 45 into a plurality of areas (a plurality of pixels) so that one area includes up to four pixel regions 45a.

Here, as an example, the pitch of adjacent areas is about 200 μm, the distance between adjacent pixel regions 45a in the same area is about 100 μm, and the diameter of the plurality of pixel regions 45a is 30 μm to 80 μm. Further, as shown in (d) of FIG. 6, the region other than the pixel region 45a of the display part 45 is the pixel surrounding region 45b.

Figure 7:
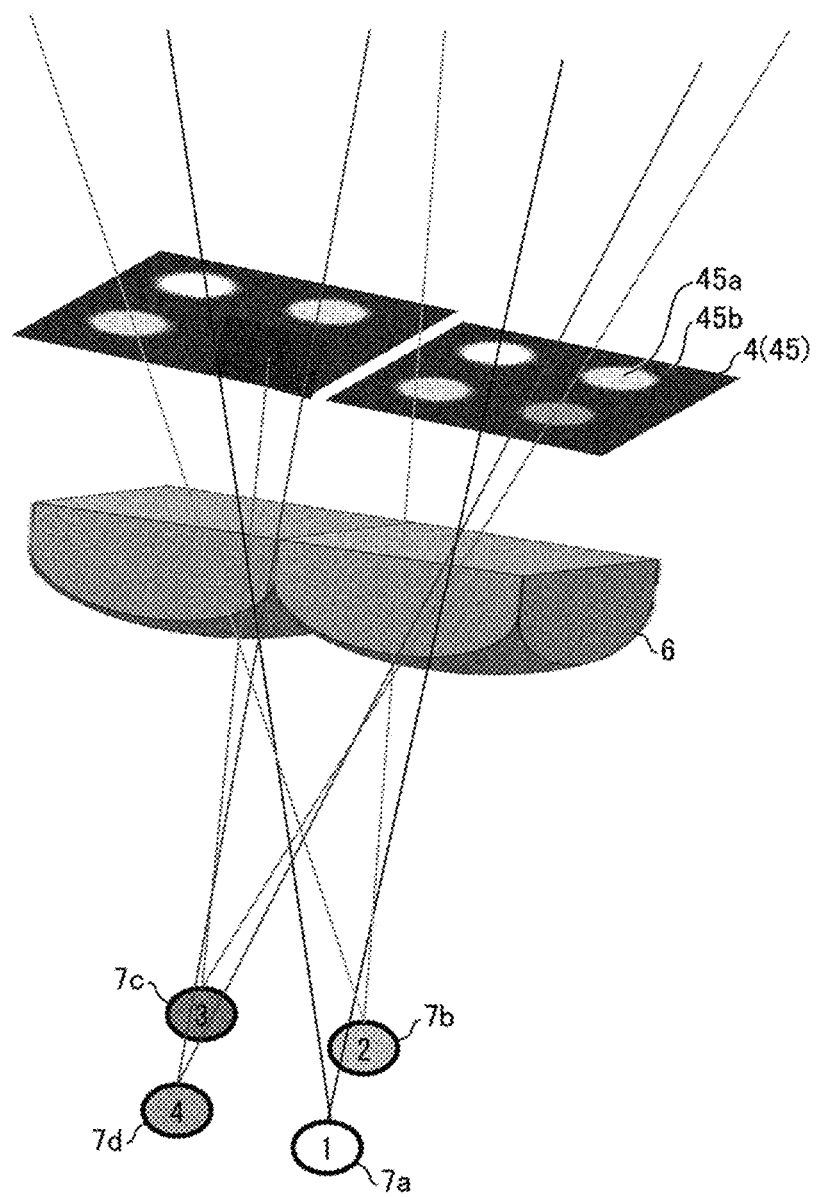
FIG. 7 is a diagram showing a correspondence relationship between the display part in (a) and (b) of FIG. 1, lenses constituting the microlens array, and light sources.

FIG. 7 is a diagram showing a correspondence relationship between the display part 45, the lenses constituting the lens array 6, and the light sources 7. The light sources 7a to 7d shown in FIG. 7 are, for example, light sources that emit a white light, a green light, a red light, and a blue light, respectively.

In FIG. 7, two pixels are shown as an example, and the light from each of the light sources is condensed on the lens array 6 to be emitted from the corresponding pixel region 45a. Each pixel is divided into the pixel regions 45a and the pixel surrounding region 45b.

§ 2 Configuration Example

Next, a configuration example showing a characteristic configuration of the display switching device 10 will be described.

(Configuration Example 1 of Display Switching Device)

Figure 2:
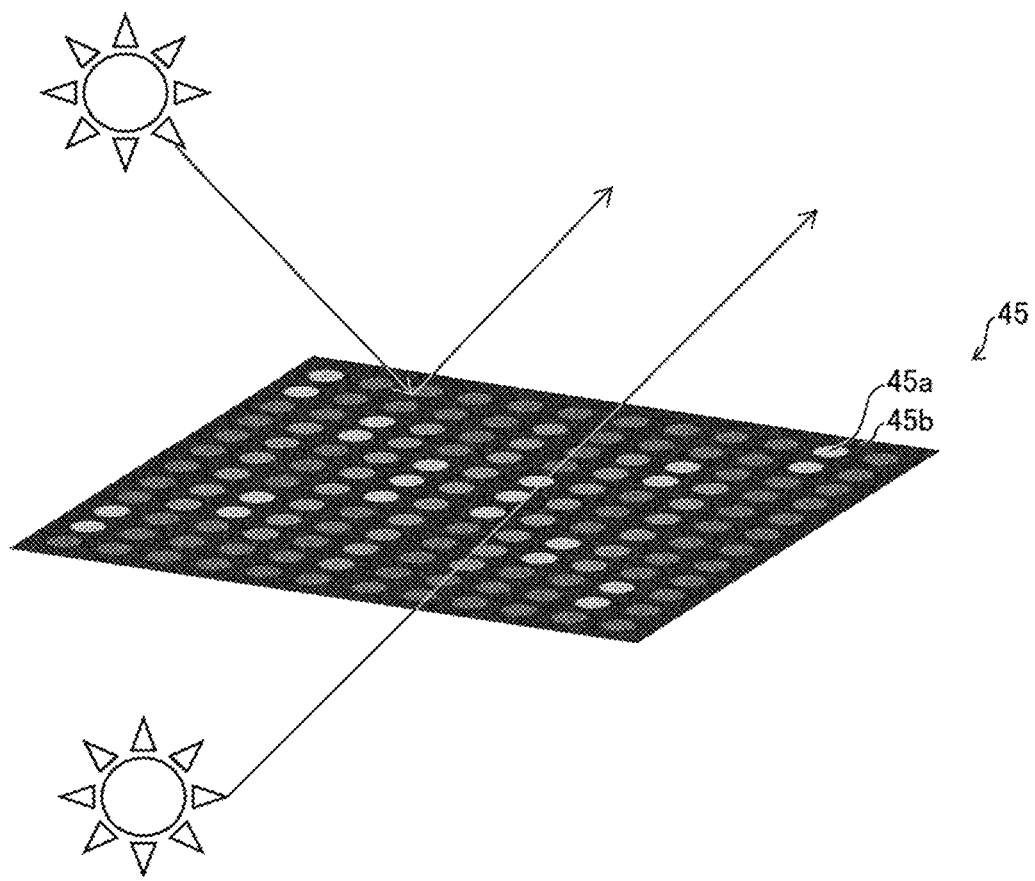

First, a state where the display part 45 of the display switching device 10 is irradiated with a disturbance light will be described with reference to FIG. 2. As shown in the drawing, it is assumed that the display part 45 is irradiated with a disturbance light from the side opposite to the side where the lens array 6 is arranged, that is, from the side where the viewpoint of the user is arranged, and that the display part 45 is irradiated with a disturbance light from the side where the lens array 6 is arranged, that is, from the back side of the display part 45 as viewed from the user.

In the configuration example 1, the location dependency of the color or reflectance in the display part 45 resulting from the disturbance light emitted from the side opposite to the side where the lens array 6 is arranged with respect to the display part 45 is lower than the location dependency of the transmittance in the display part 45 resulting from the light from the light source 7.

As described above, the location dependency described here also refers to the location where a pattern is present.

According to the above configuration, the location dependency of the color or reflectance in the display part 45 resulting from the disturbance light is lower than the location dependency of the transmittance in the display part 45 resulting from the light from the light source 7. Therefore, it is possible to prevent the problem that the stationary pattern to be switched and displayed may be faintly seen as the user visually recognizes the reflected light resulting from the disturbance light reflected by the pixel region 45a.

The configuration as described above can be realized by appropriately adjusting the transmittance and the reflectance in the pixel region 45a. For example, it is conceivable to set the transmittance so as to increase the contrast of the transmitted light amount in the display part 45 resulting from the light from the light source 7, and apply a surface treatment to the display part 45 or select an appropriate surface material so as to reduce the contrast of the reflected light resulting from the disturbance light.

(Configuration Example 2 of Display Switching Device)

In the configuration example 2, with respect to the reflection resulting from the disturbance light emitted from the side opposite to the side where the lens array 6 is arranged with respect to the display part 45, the variation width of the reflectance of the regions including both the pixel region 45a and the pixel surrounding region 45b in the plurality of pixel regions 45a is smaller than the variation width of the reflectance in only the pixel region 45a.

According to the above configuration, with respect to the reflection resulting from the disturbance light, the variation width of the reflectance of the regions including both the pixel region 45a and the pixel surrounding region 45b is smaller than the variation width of the reflectance in only the pixel region 45a. Therefore, it is possible to prevent the problem that the stationary pattern shown in the pixel region 45a may be faintly seen due to the reflection resulting from the disturbance light.

The configuration as described above can be realized by appropriately adjusting the reflectance in the pixel region 45a and the pixel surrounding region 45b. For example, it is conceivable to apply a surface treatment to the display part 45 or select an appropriate surface material.

In the above configuration example 2, the reflectance of the pixel surrounding region 45b may be constant. Thereby, it is possible to further prevent the stationary pattern to be switched and displayed from being faintly seen as the user visually recognizes the reflected light resulting from the disturbance light reflected by the pixel region.

Specifically, although not shown, the pixel surrounding regions 45b may have the same color or be made of metal.

Further, in the above configuration example 2, the reflectance of the pixel surrounding region 45b may be different according to the reflectance of the corresponding pixel region 45a.

According to the above configuration, the reflectance of the pixel surrounding region 45b is different according to the reflectance of the corresponding pixel region 45a. Therefore, the variation width of the reflectance of the regions including both the pixel region 45a and the pixel surrounding region 45b in the plurality of pixel regions 45a can be made smaller than the variation width of the reflectance in only the pixel region 45a.

Moreover, in the above configuration example 2, as shown in FIG. 15, in addition to providing the pixel region 45a and the pixel surrounding region 45b in the display part 45, the pixel surrounding region 45b may be further provided with a dummy opening 45c.

Specifically, the dummy opening 45c is provided in the pixel surrounding region 45b of the display part 45 at a position different from the position where light is condensed by each lens of the lens array 6.

According to the above configuration, the dummy opening 45c is provided at a position different from the position where light is condensed by each lens of the lens array 6. Therefore, the variation width of the reflectance of the regions including both the pixel region 45a and the pixel surrounding region 45b in the plurality of pixel regions 45a can be made smaller than the variation width of the reflectance in only the pixel region 45a without affecting the transmitted light.

Furthermore, the total area of the pixel regions 45a in the display part 45 is, for example, 60% or less of the total area of the sum of the pixel regions 45a and the pixel surrounding regions 45b. The above content indicates that the total area of the pixel regions 45a included in one pixel is 60% or less of the total area of one pixel (the total area of the sum of the pixel regions 45a and the pixel surrounding regions 45b).

According to the above configuration, the ratio of the area of the pixel regions 45a in the display part 45 is smaller than a predetermined value. Therefore, it is possible to further prevent the problem that the stationary pattern may be faintly seen due to the difference between the pixel regions 45a. The following shows the results of verification of the above.

(Verification of Aperture Ratio of Display Part)

FIG. 29 shows a relationship between the ratio (aperture ratio) of the total area of the pixel regions 45a to the total area of the sum of the pixel regions 45a and the pixel surrounding regions 45b, and the statistics of the results of visual recognition of "slightly visible" obtained from a plurality of verifiers. This verification experiment was performed under the conditions that: (1) in an ambient light of 500 lux, (2) a blank sheet was placed under the display part 45, and (3) the transmittance of the pixel surrounding region 45b was 5%.

As shown in FIG. 29, when the aperture ratio is 60% or less, 40% of the verifiers have commented that the non-displayed pattern is hardly noticed, and 50% of the verifiers have commented that the non-displayed pattern is not noticed. That is, when the aperture ratio is 60% or less, regarding "slightly visible", it can be said that it is a level that causes no practical problem.

Further, when the aperture ratio is 50% or less, the verifier who has commented that the non-displayed pattern is noticed is 0%, which is even more preferable. In addition, when the aperture ratio is 40% or less, 100% of the verifiers have commented that the non-displayed pattern is not noticed, which is even more preferable.

(Configuration Example 3 of Display Switching Device)

The configuration example 3 will be described with reference to (a) and (b) of FIG. 20. (a) of FIG. 20 is a plan diagram of the display part 45, and (b) of FIG. 20 is an enlarged diagram of a part of the display part 45. As shown in (b) of FIG. 20, an image is formed in advance in the pixel surrounding region 45b by printing or the like.

That is, with respect to the display part 45, the color or reflectance resulting from the disturbance light emitted from the side opposite to the side where the lens array 6 is arranged differs depending on the location of the pixel surrounding region 45b.

According to the above configuration, the color or reflectance resulting from the disturbance light differs depending on the location of the pixel surrounding region 45b. Therefore, it is possible for the user to visually recognize a predetermined pattern even when no light is emitted from the light source 7. Thus, the image formed by the pixel region 45a when the light source 7 does not emit light can be made inconspicuous.

(Configuration Example 4 of Display Switching Device)

Next, the configuration example 4 will be described. As described above, the display switching device 10 includes the light absorbing member 2 and the light diffusing member 3 (see (a) and (b) of FIG. 1). In the present embodiment, the light absorbing member 2 and the light diffusing member 3 may be collectively referred to as a dimming member 23.

According to the above configuration, the reflected light resulting from the disturbance light reflected in the pixel region 45a is reduced. Therefore, the difference in reflected light amount between the pixel regions 45a having different transmittances can be reduced. Thus, when the light source 7 does not emit light, the image formed by the pixel region 45a becomes more difficult to visually recognize.

Configuration examples of the dimming member 23 may include a smoked member, a half mirror, a polarizing plate, a color plate, a diffusing plate, a member for displaying a display image, a smoked member in combination with a diffusing plate to provide a diffusing function, or the like.

In the above, the transmittance of the light absorbing member 2 is 20%, for example, but it is not intended to limit the configuration of the present embodiment, and the transmittance of the dimming member 23 is 50% or less, for example.

According to the above configuration, the difference in reflected light amount between the pixels that have different transmittances can be reduced by using the dimming member 23 to absorb the light.

Furthermore, in the above, the haze value of the light diffusing member 3 is 90%, for example, but it is not intended to limit the configuration of the present embodiment, and the haze value of the dimming member 23 is 20% or more, for example.

According to the above configuration, the difference in reflected light amount between the pixels that have different transmittances can be reduced by using the dimming member 23 to diffuse the light.

(Configuration Example 5 of Display Switching Device)

Next, the configuration example 5 will be described. As described above, the display switching device 10 includes the substrate 8 and the housing 9 (see (a) and (b) of FIG. 1). In the present embodiment, the light absorbing member 2, the substrate 8, and the housing 9 may be collectively referred to as an internal light absorbing member 89.

According to the above configuration, the light that passes through the display part 45 and the lens array 6 and is reflected internally can be prevented from passing through the lens array 6 and the display part 45 again to be visually recognized by the user. Therefore, it is possible to prevent the image formed by the pixel region 45a from being faintly seen due to internal reflection of the disturbance light when the light source 7 does not emit light.

In addition, although not shown, one or a plurality of openings may be formed in the housing 9 that constitutes the internal light absorbing member 89.

As an example, the internal light absorbing member 89 is configured by at least one of the substrate 8 and the housing 9 surrounding the display switching device 10. Accordingly, since at least one of the substrate 8 and the housing 9 has a light absorbing function, it is not necessary to separately provide a member having a light absorbing function. In addition, the internal light absorbing member 89 may have an opening (not shown) or may be partially transmissive.

Specifically, the display part 45 further includes the pixel surrounding region 45b having a constant transmittance around each of the pixel regions 45a, and the color of the internal light absorbing member 89 is close to the color of the pixel surrounding region 45b as compared with a gray color having a gradation of 50%, or the reflectance of the internal light absorbing member 89 is close to the reflectance of the pixel surrounding region 45b as compared with a reflectance of 50%.

According to the above configuration, the appearance of the internal light absorbing member 89 is close to the appearance of the pixel surrounding region 45b. Therefore, it is possible to prevent the image formed by the pixel region 45a from being faintly seen due to internal reflection of the disturbance light when the light source 7 does not emit light.

§ 3 Embodiment

Variations of the embodiments of the display switching device 10 will be described hereinafter.

(Variation of Light Condensing State)

Figure 8:
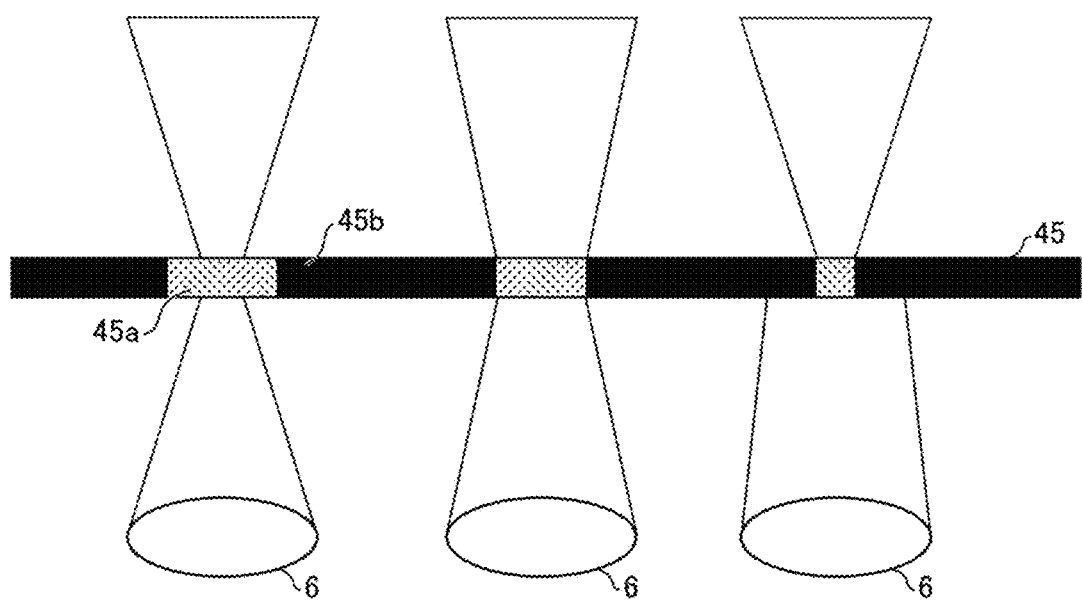
FIG. 8 is a schematic diagram showing variations of a state where a condensed light is emitted on a pixel region 45a of the display part in (a) and (b) of FIG. 1.

FIG. 8 is a schematic diagram showing variations of a state where a condensed light is emitted on the pixel region 45a of the display part 45. As shown in FIG. 8, the state of transmission of the condensed light differs according to the area of the pixel region 45a.

Specifically, the pixel region 45a refers to a region that transmits at least a part of the light condensed by the lens array 6. As shown in FIG. 8, the left and middle pixel regions 45a transmit all the condensed light, and the right pixel region 45a transmits a part of the condensed light.

(Variation of Configuration of Display Part)

(a) and (b) of FIG. 9 are schematic diagrams showing the configuration of the display part 45. As one configuration example of the display part 45, as shown in (a) of FIG. 9, the display part 45 is configured by printing the matrix layer 5 on the image layer 4 made of a light-transmissive film, for example. Here, the pixel surrounding region 45b constitutes a part of the matrix layer 5.

As another configuration example of the display part 45, as shown in (a) of FIG. 9, the display part 45 may be configured by forming a through hole 45d that transmits light in the display part 45 which is made of a material having a light transmittance of a predetermined value or more.

(a) of FIG. 18 shows another configuration example of the display part 45, and (b) of FIG. 18 shows yet another configuration example. As described above, the display part 45 is composed of the image layer 4 and the matrix layer 5. In the example shown in (a) of FIG. 18, the image layer 4 for displaying a display image and the matrix layer 5 (pixel surrounding region 45b) are integrated.

In this case, the pixel region 45a that is present in the matrix layer 5 is arranged according to the pattern to be displayed. According to this configuration, since the image layer 4 and the matrix layer 5 are integrated, it has an advantage that there is no risk of shifting of the arrangement positions of the two layers.

On the other hand, in the example shown in (b) of FIG. 18, the image layer 4, in which the transmittance distribution state is set according to the pattern to be displayed, is separated from the matrix layer 5 (which defines the pixel region 45a and the pixel surrounding region 45b). According to this configuration, since the image layer 4 and the matrix layer 5 are separated, the openings that are present in the matrix layer 5 may be fixedly provided by the number of light sources 7×the number of lenses of the lens array 6 irrespective of the pattern to be displayed.

According to this configuration, when the pattern to be displayed is changed, only the pattern to be displayed on the display part 45 is changed (change to a display part 45 having a different transmittance distribution state), and it is not required to change the matrix layer 5. That is, it has an advantage in terms of costs when the display pattern is assumed to be changed.

FIG. 19 is a diagram illustrating that an interval between the light condensing points increases as the arrangement position of the light source 7 increases the incident angle of the light with respect to the lens that constitutes the lens array 6. The distance L1 between the light condensing positions of the light source 7a and the light source 7b formed by the third lens from the right in the lens array 6 is shorter than the distance L2 between the light condensing positions of the light source 7a and the light source 7b formed by the first lens from the right in the lens array 6. That is, when the lenses in the lens array 6 are arranged at equal intervals, the position and size of the pixel region 45a in the display part 45, which is further away from the arrangement position of the light source 7, may be increased. Conversely, when the arrangement intervals of the pixel regions 45a are constant, the intervals between the lenses in the lens array 6 may be changed.

(Variation of Pixel Region)

(a) to (d) of FIG. 10 are diagrams respectively showing the shapes of the pixel regions 45a of the display part 45. As shown in (a) to (c) of FIG. 10, two pixel regions 45a are formed in one pixel, and the pixel regions 45a are shown as being circular, elliptical, or rectangular, respectively. (d) of FIG. 10 shows that four pixel regions 45a having different shapes are formed in one pixel.

(Arrangement Example 1 of Pixel Region)

(a) and (b) of FIG. 11 are diagrams respectively showing arrangement examples of the pixel regions 45a in one pixel (arrangement example 1). (a) and (b) of FIG. 11 show examples in which two pixel regions 45a are arranged in one pixel.

As shown in (a) of FIG. 11, one pixel is divided into two regions, and the pixel region 45a is formed at the center of each of the divided regions. Further, in the example shown in (b) of FIG. 11, the pixel region 45a is formed in each of the divided regions at a diagonal position in one pixel.

As shown in (a) and (b) of FIG. 11, the distance between the two pixel regions 45a shown in (b) of FIG. 11 is larger than the distance between the two pixel regions 45a shown in (a) of FIG. 11. A longer distance between the two pixel regions 45a has an advantage that the contrast is less likely to deteriorate.

(a) and (b) of FIG. 12 are diagrams illustrating how to adjust the distance between the light sources 7 according to the distance between the pixel regions 45a. In (a) and (b) of FIG. 12, the light condensing positions corresponding to the light sources 7a and 7b are 7a' and 7b'.

As shown in (a) and (b) of FIG. 12, if the distance between the light sources 7a and 7b increases, the distance between the light condensing positions 7a' and 7b' corresponding to the light sources 7a and 7b also increases. Therefore, it is possible to prevent the contrast from decreasing due to light interference between the light condensing positions 7a' and 7b'.

(Arrangement Example 2 of Pixel Region)

(a) and (b) of FIG. 13 are diagrams respectively showing arrangement examples of a plurality of pixel regions 45a in one pixel (arrangement example 2). In (a) of FIG. 13, three pixel regions 45a are shown, and in (b) of FIG. 13, four pixel regions 45a are shown. So far, the number of the pixel regions 45a has been shown as two to four, but it may be five or more.

(Variation of Arrangement of Pixel Region)

(a) to (c) of FIG. 14 are diagrams showing variations of the arrangement of the pixel regions 45a of the display part 45. In (a) of FIG. 14, the lenses of the lens array 6 are arranged one-dimensionally, in (b) of FIG. 14, the pixel regions 45a and the lenses of the lens array 6 are arranged two-dimensionally in a honeycomb shape, and in (c) of FIG. 14, the pixel regions 45a and the lenses of the lens array 6 are arranged two-dimensionally in a matrix.

As shown in (b) and (c) of FIG. 14, when the pixel regions 45a are arranged two-dimensionally, the pixels composed of a plurality of pixel regions 45a are also arranged two-dimensionally, and each lens of the lens array 6 is arranged corresponding to each pixel. Each pixel is provided with the pixel regions 45a, the number of which corresponds to the number of light sources to be switched.

The example shown in (a) of FIG. 14 shows a case where the lens array 6 has a structure in which a plurality of cylindrical lenses are arranged in one direction like the conventional lenticular lens array. In this case, the pixel regions 45a are divided into an arbitrary number along the longitudinal direction of the cylindrical lenses and arranged at arbitrary positions. Thus, even though the lens array 6 has a structure in which a plurality of cylindrical lenses are arranged in one direction, images of various patterns can be switched and displayed.

(Example of Lens Shape)

As described above, the lens array 6 includes a plurality of lenses. (a) to (c) of FIG. 16 are diagrams showing the cross-sectional shapes of the lenses constituting the lens array 6. As shown in (a) of FIG. 16, a lens having a generally spherical cross-sectional shape is frequently used (see also FIG. 5, etc.).

Nevertheless, the cross-sectional shape of the lens may be axisymmetric aspherical as shown in (b) of FIG. 16 or asymmetric aspherical as shown in (c) of FIG. 16. Regarding the lens pitch, adjacent lenses may be directly in contact with each other as shown in (a) of FIG. 17 or adjacent lenses may be in contact with an interval as shown in (b) of FIG. 17.

Since the adjacent lenses are in contact with an interval, it has an advantage that the service life of the mold used in manufacturing the lens array 6 is extended.

(Variation of Configuration of Light Source)

Although not shown, the light source 7 is configured by a RGBLED, for example, but the present embodiment is not limited thereto. The light source 7 may be an OLED, a line light source, a fiber light source, or a laser.

(Variation of Configuration of Lens Array)

FIG. 21 is a diagram showing a configuration in which the optical axis of the light source 7 is inclined. As shown in FIG. 21, the position of the light source 7 may be shifted to tilt the optical axis of the light condensed by the lens in the lens array 6. That is, by matching the optical axis to an angle at which the user's viewpoint is likely to be arranged, the amount of light visible to the user can be improved, and the contrast can be improved.

(Variation of Light Guiding Manner of Light Source)

FIG. 22 is a schematic diagram showing a configuration in which the position of the light source 7 is changed using a light guide rod 11. By providing the light guide rod 11 in this manner, even if the distance between the light source 7 and the display part 45 is long structurally, the light guide rod 11 can virtually bring the arrangement position of the light source 7 close to the display part 45.

FIG. 23 is a schematic diagram showing a configuration in which the position of the light source 7 is changed using a lens 12 other than the lenses that constitute the lens array 6. In the case of this configuration, contrary to the example of FIG. 22, the lens 12 can virtually bring the arrangement position of the light source 7 far away from the display part 45.

(Variation of Display Switching)

As described above, with the display switching device 10 according to the present embodiment, a plurality of patterns can be switched and displayed by switching the turning-on position of the light source 7. The switching of the patterns may be switching of the information to be displayed (switching of characters, switching of pictures and figures, etc.), switching between displaying a background image such as a backlight and displaying specific information, and continuous switching of a plurality of pictures for the purpose of animated display, for example. (a) and (b) of FIG. 24 show a specific example of switching between display of a background image and display of specific information. In the example shown in (a) and (b) of FIG. 24, it is switched from (a) a state where a two-dimensional image showing a button is displayed as a background image by printing to (b) a state where four triangular marks around the button and the character "ON" inside the button are displayed by turning on the light source.

Furthermore, although the above describes a case where the display switching device 10 is applied to a key-top of a keyboard for character input, the present embodiment is not limited thereto. That is, in addition to a switch for detecting an operation of the user performed on the display switching device 10 such as a switch serving as a key-top of a keyboard, the display switching device 10 may also be applied to switches such as a switch of a gaming machine, a switch of an elevator, a home electric appliance switch, and an in-vehicle switch, or may be applied to guidance/advertisement such as in-vehicle display.

The disclosure is not limited to the embodiments described above, and it is possible to make various modifications within the scope shown in the claims. Embodiments obtained by appropriately combining the technical means disclosed in different embodiments are also included in the technical scope of the disclosure.

What is claimed is:

1. A display switching device, switching a display image by switching irradiation of lights from a plurality of light source positions, the display switching device comprising:
   a lens array in which a plurality of lenses are arranged; and
   a display part,
   wherein the display part comprises:
   a plurality of pixel regions arranged to include a region through which a light, which is formed by condensing each of the lights emitted from the plurality of light source positions with each of the lenses of the lens array, passes; and
   a pixel surrounding region arranged around each of the pixel regions and having a constant transmittance,
   wherein a transmittance in each of the pixel regions is set corresponding to a predetermined stationary pattern, and
   a total area of the pixel regions in the display part is 60% or less of a total area of a sum of the pixel regions and the pixel surrounding regions.

2. The display switching device according to claim 1, wherein the lens array comprises a plurality of lenses arranged two-dimensionally.

3. A display switching device, switching a display image by switching irradiation of lights from a plurality of light source positions, the display switching device comprising:
   a lens array in which a plurality of lenses are arranged; and
   a display part comprising a plurality of pixel regions arranged to include a region through which a light, which is formed by condensing each of the lights emitted from the plurality of light source positions with each of the lenses of the lens array, passes, wherein a transmittance in each of the pixel regions is set corresponding to a predetermined stationary pattern,
   wherein a location dependency of a color or a reflectance in the display part resulting from a disturbance light emitted from a side opposite to a side where the lens array is arranged with respect to the display part is lower than a location dependency of a transmittance in the display part resulting from a light from a light source.

4. A display switching device, switching a display image by switching irradiation of lights from a plurality of light source positions, the display switching device comprising:
   a lens array in which a plurality of lenses are arranged; and
   a display part,
   wherein the display part comprises:
   a plurality of pixel regions arranged to include a region through which a light, which is formed by condensing each of the lights emitted from the plurality of light source positions with each of the lenses of the lens array, passes; and
   a pixel surrounding region arranged around each of the pixel regions and having a constant transmittance, wherein a transmittance in each of the pixel regions is set corresponding to a predetermined stationary pattern, and with respect to reflection resulting from a disturbance light emitted from a side opposite to a side where the lens array is arranged with respect to the display part, a variation width of a reflectance of regions including both the pixel region and the pixel surrounding region in the plurality of pixel regions is smaller than a variation width of a reflectance in only the pixel region.

5. The display switching device according to claim 4, wherein a reflectance of the pixel surrounding region is constant.

6. The display switching device according to claim 4, wherein the display part further comprises a pixel surrounding region having a constant transmittance around each of the pixel regions, and the pixel surrounding region blocks a light from the side where the lens array is arranged.

7. The display switching device according to claim 4, wherein a reflectance of the pixel surrounding region differs according to a reflectance of the corresponding pixel region.

8. The display switching device according to claim 7, wherein a dummy opening is provided in the pixel surrounding region at a position different from a position where the light is condensed by each of the lenses of the lens array.

9. The display switching device according to claim 4, wherein the display part further comprises a pixel surrounding region having a constant transmittance around each of the pixel regions, and a total area of the pixel regions in the display part is 60% or less of a total area of a sum of the pixel regions and the pixel surrounding regions.

10. A display switching device, switching a display image by switching irradiation of lights from a plurality of light source positions, the display switching device comprising:

a lens array in which a plurality of lenses are arranged; and a display part, wherein the display part comprises:

a plurality of pixel regions arranged to include a region through which a light, which is formed by condensing each of the lights emitted from the plurality of light source positions with each of the lenses of the lens array, passes; and a pixel surrounding region arranged around each of the pixel regions and having a constant transmittance, wherein a transmittance in each of the pixel regions is set corresponding to a predetermined stationary pattern, and a color or a reflectance resulting from a disturbance light emitted from a side opposite to a side where the lens array is arranged with respect to the display part differs depending on a location of the pixel surrounding region.

11. A display switching device, switching a display image by switching irradiation of lights from a plurality of light source positions, the display switching device comprising:

a lens array in which a plurality of lenses are arranged; and a display part comprising a plurality of pixel regions arranged to include a region through which a light, which is formed by condensing each of the lights emitted from the plurality of light source positions with each of the lenses of the lens array, passes, wherein a transmittance in each of the pixel regions is set corresponding to a predetermined stationary pattern, wherein the display switching device further comprises a dimming member, absorbing or diffusing a light, on a side opposite to a side where the lens array is arranged with respect to the display part.

12. The display switching device according to claim 11, wherein a transmittance of the dimming member is 50% or less.

13. The display switching device according to claim 11, wherein a haze value of the dimming member is 20% or more.

14. A display switching device, switching a display image by switching irradiation of lights from a plurality of light source positions, the display switching device comprising:

a lens array in which a plurality of lenses are arranged; and a display part comprising a plurality of pixel regions arranged to include a region through which a light, which is formed by condensing each of the lights emitted from the plurality of light source positions with each of the lenses of the lens array, passes, wherein a transmittance in each of the pixel regions is set corresponding to a predetermined stationary pattern, wherein the display switching device further comprises an internal light absorbing member, absorbing a disturbance light emitted from a side opposite to a light source, on a light source side with respect to the lens array.

15. The display switching device according to claim 14, wherein the internal light absorbing member is configured by at least one of a substrate and a housing surrounding the display switching device.

16. The display switching device according to claim 14, wherein the display part further comprises a pixel surrounding region having a constant transmittance around each of the pixel regions, and a color of the internal light absorbing member is close to a color of the pixel surrounding region as compared with a gray color having a gradation of 50%, or a reflectance of the internal light absorbing member is close to a reflectance of the pixel surrounding region as compared with a reflectance of 50%.

17. The display switching device according to claim 14, comprising:

an image layer in which a transmittance distribution state is set according to a pattern to be displayed; and a matrix layer provided separately from the image layer and defining the pixel regions and the pixel surrounding regions.

18. A switch comprising the display switching device according to claim 14, and detecting an operation of a user performed on the display switching device.

* * * * *